(12) United States Patent
Ponulak

(10) Patent No.: US 9,213,937 B2
(45) Date of Patent: Dec. 15, 2015

(54) APPARATUS AND METHODS FOR GATING ANALOG AND SPIKING SIGNALS IN ARTIFICIAL NEURAL NETWORKS

(71) Applicant: Brain Corporation, San Diego, CA (US)

(72) Inventor: Filip Ponulak, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 332 days.

(21) Appl. No.: 13/761,090

(22) Filed: Feb. 6, 2013

(65) Prior Publication Data
US 2014/0222739 A1 Aug. 7, 2014

(51) Int. Cl.
G06F 15/18 (2006.01)
G06N 3/08 (2006.01)
G06N 3/04 (2006.01)

(52) U.S. Cl.
CPC ..................................... *G06N 3/049* (2013.01)

(58) Field of Classification Search
None
See application file for complete search history.

(56) References Cited

U.S. PATENT DOCUMENTS

| | | |
|---|---|---|
| 5,063,603 A | 11/1991 | Burt |
| 5,092,343 A | 3/1992 | Spitzer et al. |
| 5,245,672 A | 9/1993 | Wilson et al. |
| 5,355,435 A | 10/1994 | DeYong et al. |
| 5,388,186 A | 2/1995 | Bose |
| 5,408,588 A | 4/1995 | Ulug |
| 5,467,428 A | 11/1995 | Ulug |
| 5,638,359 A | 6/1997 | Peltola |
| 5,673,367 A | 9/1997 | Buckley |
| 5,875,108 A | 2/1999 | Hoffberg |
| 6,009,418 A | 12/1999 | Cooper |
| 6,014,653 A | 1/2000 | Thaler |
| 6,169,981 B1 | 1/2001 | Werbos |
| 6,363,369 B1 | 3/2002 | Liaw et al. |
| 6,458,157 B1 | 10/2002 | Suaning |

(Continued)

FOREIGN PATENT DOCUMENTS

| | | |
|---|---|---|
| CN | 102226740 A | 10/2011 |
| EP | 1089436 A2 | 4/2001 |

(Continued)

OTHER PUBLICATIONS

Aleksandrov (1968), Stochastic optimization, Engineering Cybernetics, 5, 11-16.

(Continued)

*Primary Examiner* — Kakali Chaki
*Assistant Examiner* — Daniel Pellett
(74) *Attorney, Agent, or Firm* — Gazdzinski & Associates, PC

(57) ABSTRACT

Apparatus and methods for universal node design implementing a universal learning rule in a mixed signal spiking neural network. In one implementation, at one instance, the node apparatus, operable according to the parameterized universal learning model, receives a mixture of analog and spiking inputs, and generates a spiking output based on the model parameter for that node that is selected by the parameterized model for that specific mix of inputs. At another instance, the same node receives a different mix of inputs, that also may comprise only analog or only spiking inputs and generates an analog output based on a different value of the node parameter that is selected by the model for the second mix of inputs. In another implementation, the node apparatus may change its output from analog to spiking responsive to a training input for the same inputs.

28 Claims, 10 Drawing Sheets

(56) References Cited

U.S. PATENT DOCUMENTS

| | | |
|---|---|---|
| 6,532,454 B1 | 3/2003 | Werbos |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,601,049 B1 | 7/2003 | Cooper |
| 6,643,627 B2 | 11/2003 | Liaw et al. |
| 6,917,925 B2 | 7/2005 | Berenji et al. |
| 7,395,251 B2 | 7/2008 | Linsker |
| 7,426,501 B2 | 9/2008 | Nugent |
| 7,672,920 B2 | 3/2010 | Ito et al. |
| 7,752,544 B2 | 7/2010 | Cheng |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 8,655,815 B2 | 2/2014 | Palmer |
| 8,751,042 B2 | 6/2014 | Lee |
| 2002/0038294 A1 | 3/2002 | Matsugu |
| 2003/0050903 A1 | 3/2003 | Liaw et al. |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2008/0162391 A1 | 7/2008 | Izhikevich |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0169098 A1 | 7/2010 | Patch |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073493 A1 | 3/2013 | Modha |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0204820 A1 | 8/2013 | Hunzinger |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325766 A1 | 12/2013 | Petre |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325776 A1 | 12/2013 | Ponulak et al. |
| 2013/0325777 A1 | 12/2013 | Petre |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0081895 A1 | 3/2014 | Coenen et al. |
| 2014/0193066 A1 | 7/2014 | Richert |
| 2014/0222739 A1 | 8/2014 | Ponulak |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 A2 | 7/2008 |
| WO | 2008132066 A1 | 11/2008 |

OTHER PUBLICATIONS

Amari (1998), Why natural gradient?, Acoustics, Speech and Signal Processing. (pp. 1213-1216). Seattle, WA, USA.

Baras, D. et al. "Reinforcement learning, spike-time-dependent plasticity, and the BCM rule." Neural Computation vol. 19 No. 8 (2007): pp. 2245-2279.

Bartlett et al., (2000) "A Biologically Plausible and Locally Optimal Learning Algorithm for Spiking Neurons" Retrieved from http://arp.anu.edu.au/ftp/papers/ jon/brains.pdf.gz.

Baxter et al. (2000.). Direct gradient-based reinforcement learning. In Proceedings of the international Symposium on Circuits.

Bennett, M.R., (1999), The early history of the synapse: from Plato to Sherrington.Brain Res. Bull., 50(2): 95-118.

Bohte et al., "A Computational Theory of Spike-Timing Dependent Plasticity: Achieving Robust Neural Responses via Conditional Entropy Minimization" 2004.

Bohte, (2000). SpikeProp: backpropagation for networks of spiking neurons. In Proceedings of ESANN'2000, (pp. 419-424).

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi ,n11-sbolltedmblica6ond)hdthesislxif>.

Booij (Jun. 2005). A Gradient Descent Rule for Spiking Neurons Emitting Multiple Spikes. Information Processing Letters n. 6, v.95, 552-558.

Bouganis et al., (2010) "Training a Spiking Neural Network to Control a 4-DoF Robotic Arm based on Spike Timing-Dependent Plasticity". Proceedings of WCC1201 0 IEEE World Congress on Computational Intelligence, CCIB, Barcelona, Spain, Jul. 18-23, 2010, pp. 4104-4111.

Breiman et al., "Random Forests" 33pgs, Jan. 2001.

Brette et al., Brian: a simple and flexible simulator for spiking neural networks, The Neuromorphic Engineer, Jul. 1, 2009, pp. 1-4, doi: 10.2417/1200906.1659.

Capel, "Random Forests and Ferns" LPAC, Jan. 11, 2012, 40 pgs.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators. Frontiers in Neuroinformatics, Jan. 2009, pp. 1-10, vol. 2, Article 11.

D'Cruz (1998) Reinforcement Learning in Intelligent Control: A Biologically-Inspired Approach to the Re/earning Problem Brendan May 1998.

de Queiroz, M. et al. "Reinforcement learning of a simple control task using the spike response model." Neurocomputing vol. 70 No. 1 (2006): pp. 14-20.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl I ):P80.

El-Laithy (2011), A reinforcement learning framework for spiking networks with dynamic synapses, Comput Intell Neurosci.

Fidjeland et al., Accelerated Simulation of Spiking Neural Networks Using GPUs [online],2010 [retrieved on Jun. 15, 2013], Retrieved from the Internet: URL:http:// ieeexplore.ieee.org/xpls/abs_all.jsp?ammber=5596678&tag=1.

Fletcher (1987), Practical methods of optimization, New York, NY: Wiley-Interscience.

Floreano et al. "Neuroevolution: From Architectures to learning" Evol. Intel. Jan 2008 1:47-62 (retrieved online on Apr. 24, 2013 from http://infoscience.epfl.ch/record/112676/files/FloreanoDuerrMattiussi2008.pdf).

(56) References Cited

OTHER PUBLICATIONS

Florian (2005), A reinforcement learning algorithm for spiking neural networks SYNASC '05 Proceedings of the Seventh International Symposium on Symbolic and Numeric Algorithms for Scientific Computing.

Florian *Reinforcement Learning Through Modulation of Spike-Timing-Dependent Synaptic Plasticity,* Razvan V. Florian Neural Computation 19, 1468-1502 (2007) Massachusetts Institute of Technology.

Fremaux et al., "Functional Requirements for Reward-Modulated Spike-Timing-Dependent Plasticity", The Journal of Neuroscience, Oct. 6, 2010, 30 (40):13326-13337.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Fu (2005) Stochastic Gradient Estimation, Technical Research Report.

Fu (2008), What You Should Know About Simulation and Derivatives Naval Research Logistics, vol. 55, No. 8 , 723-736.

Fyfe et al., (2007), Reinforcement Learning Reward Functions for Unsupervised Learning, ISNN '07 Proceedings of the 4th international symposium on Neural Networks: Advances in Neural Networks.

Gerstner (2002), Spiking neuron models: single neurons, populations, plasticity, Cambridge, U.K.: Cambridge University Press.

Gewaltig et al., 'NEST (Neural Simulation Tool)', Scholapedia, 2007, pp. 1-15, 2(4): 1430. doi: 10.4249/scholapedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Glynn (1995), Likelihood ratio gradient estimation for regenerative stochastic recursions, Advances in Applied Probability, 27, 4, 1019-1053.

Goodman et al., Brian: a simulator for spinking neural networks in Python, Frontiers in Neuroinformatics, Nov. 2008. pp. 1-10, vol. 2, Article 5.

Gorchetchnikov et al., NineML: declarative, mathematically-explicit descriptions of spiking neuronal networks, Frontiers in Neurinformatics, Conference Abstract: 4th INCF Congress of Neuroinformatics, doi: 1 0.3389/conf.fninf.2011.08.00098.

Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.

Ho, "Random Decision Forests" Int'l Conf. Document Analysis and Recognition, 1995, 5 pgs.

Izhikevich (2007), Solving the distal reward problem through linkage of STDP and dopamine signaling, Cerebral Cortex, vol. 17, pp. 2443-2452.

Izhikevich et al., 'Relating STDP to BCM', Neural Computation (2003) 15, 1511-1523.

Izhikevich, E. (2007), *Solving the Distal Reward Problem through Linkage of STDP and Dopamine Signaling*, Cerebral Cortex, 17, 2443-2452.

Izhikevich, 'Simple Model of Spiking Neurons', IEEE Transactions on Neural Networks, vol. 14, No. 6, Nov. 2003, pp. 1569-1572.

Kaelbling, Leslie Pack, Michael L. Littman, and Andrew W. Moore, "Reinforcement learning: A survey." arXiv preprint cs/96051 03 (1996).

Kalal et al. "Online learniing of robust object detectors during unstable tracking" published on 3rd On-line Learning for Computer Vision Workshop 2009, Kyoto, Japan, IEEE CS.

Karbowski et al., 'Multispikes and Synchronization in a Large Neural Network with Temporal Delays', Neural Computation 12, 1573-1606 (2000).

Kenju, (2000), Reinforcement Learning in Continuous Time and Space, Neural Computation, 12:1, 219-245.

Kiefer (1952), Stochastic Estimation of the Maximum of a Regression Function, Annals of Mathematical Statistics 23, #3, 462-466.

Klampfl, (2009). Spiking neurons can learn to solve information bottleneck problems and extract independent components, Neural Computation, 21(4), pp. 911-959.

Kleijnen et al., "Optimization and sensitivity analysis of computer simulation models by the score function method", Invited Review European Journal of Operational Research, Mar. 1995.

Klute et al., (2002). Artificial Muscles: Actuators for Biorobotic Systems. The International Journal 0./ Robotics Research 21:295-309.

Larochelle et al., (2009), Exploring Strategies for Training Deep Neural Networks, J. of Machine Learning Research, v. 10, pp. 1-40.

Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Legenstein et al., (2008), A learning theory for reward-modulated spike timing-dependent plasticity with application to biofeedback. PLoS Computational Biology, 4(10): 1-27.

Lendek et al., (2006) State Estimation under Uncertainty: A Survey. Technical report 06-004, Delft Center for Systems and Control Delft University of Technology.

Masakazu et al, "Convolutional Spiking Neural Network Model for Robust Face Detection", 2002 Proceedings of the 9th International Conference on Neural Information Processing (ICONIP'02), vol. 2; pp. 660-664.

Morrison, (2008)Phenomenological models of synaptic plasticity based on spike timing, Accepted: Apr. 9, 2008 The Author(s).

Nikolic et al., (2011) High-sensitivity silicon retina for robotics and prosthetics.

Ojala et al.. "Performance Evaluation of Texture Measures with Classification Based on Kullback Discrimination of Distributions" 1994 IEEE, pp. 582-585.

Ozuysal et al., "Fast Keypoint Recognition in Ten Lines of Code" CVPR 2007.

Ozuysal et al., "Fast Keypoint Recognition Using Random Ferns" IEEE Transactions on Pattern Analysis and Machine Intelligence, Vol, 32, No. 3, Mar. 2010, pp. 448-461.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. Spiking neural network training using evolutionary algorithms. In: Proceedings 2005 IEEE International Joint Conference on Neural Networkds, 2005. IJCNIN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

PCT International Search Report and Written Opinion for International Appl. No. PCT/US2013/044124 dated Sep. 12, 2013.

PCT International Search Report for International Application PCT/US2013/060352 dated Jan. 16, 2014.

PCT International Search Report for International Application PCT/US2013/026738 dated Jul. 21, 2014 (10 pgs).

PCT International Search Report for PCT/US2013/052136 dated Nov. 30, 2013.

Pfister (2003), Optimal Hebbian Learning: A Probabilistic Point of View, In ICANN Proceedings. Springer, pp. 92-98.

Pfister (2006), Optimal Spike-Timing Dependent Plasticity for Precise Action Potential Firing in Supervised Learning, Neural computation ISSN 0899-7667, 18-6.

Ponulak (2006) Supervised Learning in Spiking Neural Networks with ReSuMe Method. Doctoral Dissertation Poznan, Poland.

Ponulak et al., (2010) Supervised Learning in Spiking Neural Networks with ReSuMe: Sequence Learning, Classification and Spike-Shifting. Neural Comp., 22 (2): 467-510.

Ponulak, (2005), ReSuMe—New supervised learning method for Spiking Neural Networks. Technical Report, Institute of Control and Information Engineering, Poznan University of Technology.

(56) References Cited

OTHER PUBLICATIONS

Prokhorov, Danil V., and Lee A. Feldkamp, "Primitive adaptive critics." Neural Networks, 1997, International Conference on vol. 4. IEEE, 1997.
Reiman et al. (1989). Sensitivity analysis for simulations via likelihood ratios. Oper Res 37, 830-844.
Robbins (1951), A Stochastic Approximation Method, Annals of Mathematical Statistics 22, #3, 400-407.
Rosenstein et al., (2002), Supervised learning combined with an actor-critic architecture, Technical Report 02-41, Department of Computer Science, University of Massachusetts, Amherst.
Rumelhart (1986), Learning internal representations by error propagation, Parallel distributed processing, vol. 1 (pp. 318-362), Cambridge, MA: MIT Press.
Rumelhart et al., (1986), Learning representations by back-propagating errors, Nature 323 (6088) . pp. 533-536.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Schreiber et al., (2003). A new correlation-based measure of spike timing reliability. Neurocomputing, 52-54, 925-931.
Seung, H. "Learning in spiking neural networks by reinforcement of stochastic synaptic transmission." Neuron vol. 40 No. 6 (2003): pp. 1063-1073.
Simulink.RTM. model [online], [Retrieved on Dec. 10, 2013] Retrieved from URL: http://www.mathworks.com/products/simulink/index.html> (2 pgs).
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sinyavskiy O. Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011. pages 859-875.
Sinyavskiy, et at. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.
Sjostrom et al., 'Spike-Timing Dependent Plasticity' Scholarpedia, 5(2):1362 (2010), pp. 1-18.
Stein, (1967). Some models of neural variability. Biophys. J., 7: 37-68.
Sutton R.S. (1988). *Learning to predict by the methods of temporal differences.* Machine Learning 3(1), 9-44.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.10008 79#>.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weight Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 5239-5244).
Vasilaki et al., "Spike-Based Reinforcement Learning in Continuous State and Action Space: When Policy Gradient Methods Fail" PLoS, vol. 5, Issue 12, Dec. 2009.
Vasilaki, et al., "Learning flexible sensori-motor mappings in a complex network" Biol Cybern (2009) 100:147-158.
Vision Systems Design, "In search of the artificial retina" [online], Apr. 1, 2007.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Weber et al., (2009), Goal-Directed Feature Learning, In: Proc, International Joint Conference on Neural Networks, 3319-3326.
Weber, C. et al. 'Robot docking with neural vision and reinforcement.' Knowledge-Based Systems vol. 17 No. 2 (2004): pp. 165-172.
White et al., (Eds.) (1992) Handbook of Intelligent Control: Neural, Fuzzy and Adaptive Approaches. Van Nostrand Reinhold, New York.
Widrow et al., (1960) Adaptive Switching Circuits. Ire Wescon Convention Record 4: 96-104.
Williams (1992), Simple Statistical Gradient-Following Algorithms for Connectionist Reinforcement Learning, Machine Learning 8, 229-256.
Xie et al., (2004) "Learning in neural networks by reinforcement of irregular spiking", Physical Review E, vol. 69, letter 041909, pp. 1-10.
Yi (2009), Stochastic search using the natural gradient, ICML '09 Proceedings of the 26th Annual International Conference on Machince Learning. New York, NY, USA.

APPARATUS AND METHODS FOR GATING ANALOG AND SPIKING SIGNALS IN ARTIFICIAL NEURAL NETWORKS

CROSS-REFERENCE TO RELATED APPLICATIONS

This application is related to co-owned U.S. patent application Ser. No. 13/238,932 filed Sep. 21, 2011, entitled "ADAPTIVE CRITIC APPARATUS AND METHODS", now issued as U.S. Pat. No. 9,156,165, U.S. patent application Ser. No. 13/313,826, filed Dec. 7, 2011, entitled "APPARATUS AND METHODS FOR IMPLEMENTING LEARNING FOR ANALOG AND SPIKING SIGNALS IN ARTIFICIAL NEURAL NETWORKS", U.S. patent application Ser. No. 13/314,018, filed Dec. 7, 2011, entitled "APPARATUS AND METHODS FOR IMPLEMENTING LEARNING FOR ANALOG AND SPIKING SIGNALS IN ARTIFICIAL NEURAL NETWORKS", and U.S. patent application Ser. No. 13/314,066, filed Dec. 7, 2011, entitled "NEURAL NETWORK APPARATUS AND METHODS FOR SIGNAL CONVERSION", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates to machine learning apparatus and methods, and in particular, to learning with analog and/or spiking signals in artificial neural networks.

2. Description of Related Art

Artificial spiking neural networks are frequently used to gain an understanding of biological neural networks and for solving artificial intelligence problems. These networks typically employ pulse-coded mechanisms, which encode information using the timing of pulses. Such pulses (also referred to as "spikes" or 'impulses') are short-lived (typically on the order of 1-2 ms) discrete temporal events. Several exemplary embodiments of such encoding are described in a commonly owned and co-pending U.S. patent application Ser. No. 13/152,084 entitled "APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", now issued as U.S. Pat. No. 8,942,466, each incorporated herein by reference in its entirety.

Spiking neural networks offer several benefits over other classes of neural networks, including without limitation: greater information and memory capacity, richer repertoire of behaviors (tonic and/or phasic spiking, bursting, spike latency, spike frequency adaptation, resonance, threshold variability, input accommodation and bi-stability), as well as efficient hardware implementations.

Biological neurons may be classified according to their electrophysiological characteristics and discharge patterns: Similarly, in artificial spiking neuron networks, tonic or regular spiking may be used to describe neuron behavior where the neuron is typically constantly (or tonically) active. Phasic or bursting spiking may be used to describe neuron behavior where the neuron fires in bursts.

In various implementations of spiking neural networks, it may be assumed that weights are the parameters that can be adapted. This process of adjusting the weights is commonly referred to as "learning" or "training".

Supervised learning is often used with spiking neural networks. In supervised learning, a set of example pairs $(x, y^d)$, $x \in X$, $y^d \in Y$ are given, where X is the input domain and Y is the output domain, and the aim is to find a function $f; X \rightarrow Y$ in the allowed class of functions that matches the examples. In other words, we wish to infer the mapping implied by the data. The learning process is evaluated using a so-called "cost function", which quantifies the mismatch between the mapping and the data, and it implicitly contains prior knowledge about the problem domain. A commonly used cost is the mean-squared error, which tries to minimize the average squared error between the network's output, y, and the target value $y^d$ over all the example pairs.

In various control applications (e.g., when controlling a motor actuator), it may be required to gate analog and/or spiking signals based on a spiking and/or analog input. When implementing gating functionality, most existing methodologies for implementing learning for analog and spiking signals in artificial neural networks may employ different node types and learning algorithms configured to process only one, specific signal type, for example, only analog or only spiking signal type. Such an approach has several shortcomings, for example, the necessity to provide and maintain learning rules and nodes of different types and node duplication and proliferation in circumstances in which the network is configured to process signals of the mixed types (analog and spiking). Network configurations comprising nodes of different types, therefore prevent dynamic node reconfiguration and reuse during network operation. Furthermore, learning methods of prior art that are suitable for learning for analog signals are not suitable for learning for spike-timing encoded signals. Similarly learning rules for spike-based signals are not efficient in training neural networks for processing analog signals.

Based on the foregoing, there is a salient need for apparatus and method for implementing unified approach to learning and training of artificial neuronal network comprising spiking neurons that are capable of processing spiking and/or analog inputs and generating spiking and/or analog outputs.

SUMMARY

The present disclosure satisfies the foregoing needs by providing, inter cilia, apparatus and methods for implementing learning in artificial neural networks.

In one aspect of the disclosure, a method of operating a node in a computerized neural network is disclosed. In one embodiment, the method includes: (i) causing the node to generate tonic spiking output using a learning rule which combines at least one spiking input signal and at least one analog input, and (ii) causing the node to suppress output generation for a period of time using a teaching signal associated with the learning rule.

In a second aspect of the disclosure, a computer implemented method of implementing learning in a neural network is disclosed. In one embodiment, the method includes: (i) processing (e.g., at a node of the network), at least one spiking input signal and at least one analog input signal using a parameterized rule, (ii) modifying a state of the node in accordance with the parameterized rule in accord with the spiking signal and the analog signal, and (iii) generating a spiking output signal at the node based on the modification of the node state.

In a third aspect of the disclosure, a computer-implemented method of synaptic gating in a network is disclosed. In one embodiment, the method is performed by one or more processors configured to execute computer program modules.

In one variant, the method includes: (i) generating an output at a node of the network, the output configured to inhibit a gating unit of the network, (ii) based on at least one spiking input signal, at least one continuous input signal and a teaching signal, pausing generation of the output; and (iii) based on the pausing, activating the gating unit, thereby effectuating the synaptic gating.

In a fourth aspect of the disclosure, a non-transitory computer-readable apparatus configured to store one or more processes thereon is disclosed. In one embodiment, the one or more processes are configured to implement a learning rule on a neural network. The one or more processes comprise in one variant a plurality of instructions configured to, when executed: (i) receive, at a node of the neural network, at least one discreet input signal and at least one continuous input signal, (ii) based at least in part on the at least one discreet signal and the at least one continuous signal, adjust at least one characteristic of the node in accordance with the learning rule, and (iii) based at least in part on the adjustment, generate at least one of (a) a discreet output and (b) a continuous output at the node.

In a fifth aspect of the disclosure, a neural network configured to implement synaptic gating in accordance with at least one parameterized rule is disclosed. In one embodiment, the network includes: (i) a plurality of connections configured to facilitate transmission of spiking and non-spiking signals and (ii) a plurality of mixed-mode nodes inoperative communication with said plurality of connections.

In one variant, the nodes are configured to: (i) generate an output configured to inhibit one or more synaptic gates, and (ii) cease generation of the output for a duration based on a parameterized rule. In response to the cessation, the one or more synaptic gates are configured to switch one or more signals transmitted via the plurality of connections.

In a sixth aspect of the disclosure, neuronal network logic is disclosed. In one implementation, the neuronal network logic comprises a series of computer program steps or instructions executed on a digital processor. In another implementation, the logic comprises hardware logic (e.g., embodied in an ASIC or FPGA).

In a seventh aspect of the disclosure, a computer readable apparatus is disclosed. In one implementation the apparatus comprises a storage medium having at least one computer program stored thereon. The program is configured to, when executed, implement learning in a mixed signal artificial neuronal network.

In an eighth aspect of the disclosure, a system is disclosed. In one implementation, the system comprises an artificial neuronal (e.g., spiking) network having a plurality of "universal" nodes associated therewith, and a controlled apparatus (e.g., robotic or prosthetic apparatus).

In a ninth aspect of the disclosure, a universal node for use in a neural network is disclosed. In one implementation, the node comprises a node capable of dynamically adjusting or learning with respect to heterogeneous (e.g., spiking and non-spiking) inputs.

Further features of the present disclosure, its nature and various advantages will be more apparent from the accompanying drawings and the following detailed description.

Figure 1:
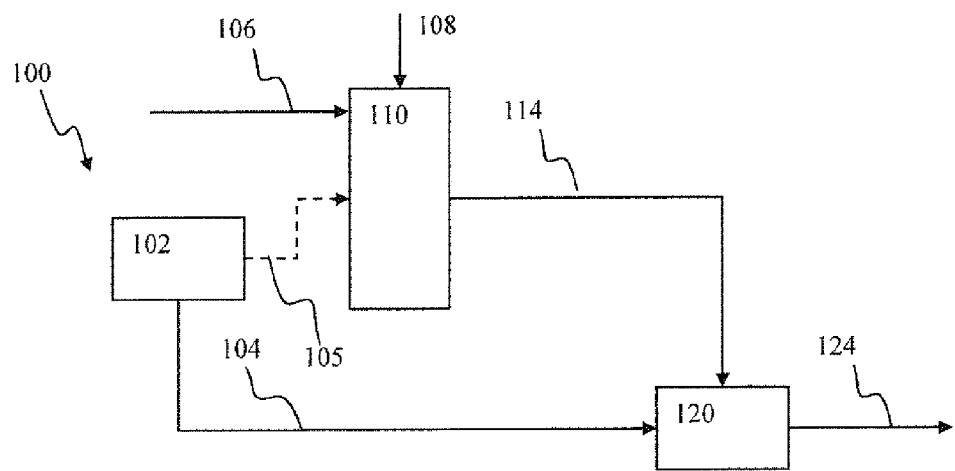
FIG. 1 is a block diagram illustrating gating mechanism in a mixed signal spiking neuron network, in accordance with one or more implementations.

All Figures disclosed herein are © Copyright 2012-2013 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation. Rather, other implementations are possible by way of interchange of or combination with any or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" may be meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" may be meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" may be meant to refer, without limitation, to a network unit (e.g., a spiking neuron and a set of synapses configured to provide input signals to the neuron) having parameters that are subject to adaptation in accordance with a model.

As used herein, the terms "state" and "node state" may be meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" may include one or more of IEEE-Std. 802.11, variants of IEEE-Std. 802.11, standards related to IEEE-Std. 802.11 (e.g., 802.11 a/b/g/n/s/v/ac), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Overview

In one aspect of the disclosure, apparatus and methods for universal node design directed implementing a universal learning rule in a neural network are disclosed. This approach advantageously allows, inter alia, simultaneous processing of different input signal types (e.g., spiking and non-spiking, such as analog) by the nodes; generation of spiking and non-spiking signals by the node; and dynamic reconfiguration of universal nodes in response to changing input signal type and/or learning input at the node, not available to the existing spiking network solutions. These features are enabled, at least in part, through the use of a parameterized universal learning model configured to automatically adjust node model parameters responsive to the input types during training, and is especially useful in mixed signal (heterogeneous) neural network applications.

In one implementation, at one instance, the node apparatus, operable according to the parameterized universal learning model, receives a mixture of analog and spiking inputs, and generates a spiking output based on the node parameter that is selected by the parameterized model for that specific mix of inputs. At another instance, the same node receives a different mix of inputs, that also may comprise only analog or only spiking inputs) and generates an analog output based on a different value of the node parameter that is selected by the model for the second mix of inputs.

In another implementation, the node apparatus may change its output from analog to spiking responsive to a training input for the same inputs.

Thus, unlike traditional artificial neuronal networks, the universal spiking node of the exemplary embodiment of the present disclosure may be configured to process a mixed set of inputs that may change over time, using the same parameterized model. This configuration advantageously facilitates training of the spiking neural network, and allows node reuse when the node representation of input and output signals (spiking vs. non-spiking signal representation) to the node changes.

In a broader sense, the disclosure provides methods and apparatus for implementing a universal learning mechanism that operates on different types of signals, including but not limited to firing rate (analog) and spiking signals.

DETAILED DESCRIPTION

Detailed descriptions of the various aspects, implementations and variants of the apparatus and methods of the disclosure are now provided.

The disclosure finds broad practical application. Implementations of the disclosure may be, for example, deployed in a hardware and/or software implementation of a computer-controlled system, provided in one or more of a prosthetic device, robotic device and any other specialized apparatus. In one such implementation, a control system may include a processor embodied in an application specific integrated circuit (ASIC), a central processing unit (CPU), a graphics processing unit (GPU), a digital signal processor (DSP) or an application specific processor (ASIP) or other general purpose multiprocessor, which can be adapted or configured for use in an embedded application such as controlling a robotic device. However, it will be appreciated that the innovation is in no way limited to the foregoing applications and/or implementations.

Principles of the present disclosure may advantageously be applicable to various control applications (such as, for example, robot navigation controller; an automatic drone stabilization, robot arm control, etc.) that use a spiking neural network as the controller and comprise a set of sensors and actuators that produce signals of different types. Some sensors may communicate their state data using analog variables, whereas other sensors employ spiking signal representation.

By way of example, a set of such heterogeneous sensors may comprise, without limitation, the following:
- an odometer that provides an analog signal being an estimate of a distance travel;
- a laser range detectors providing information on a distance to obstacles, with the information being encoded using non-spiking (analog) signals;
- a neuromorphic camera configured to encode visual information in sequences of spikes;
- an adjustable accelerometer configured to encode slow varying motions using non-spiking (analog) signals and rapidly varying motions using spike timing signals;
- an array of tactile sensors that encode touch information using timing of spiking.

Similarly, some of the actuators (e.g., electric DC motors, pneumatic or hydraulic cylinders, etc.) may be driven by analog signals, while other actuators may be driven by analog or spiking signals (e.g. stepper motors, and McKibben artificial muscles). In such heterogeneous system, the spiking controller may be required to integrate and concurrently process analog and spiking signals and similarly produce spiking and analog signals on its different outputs.

In some applications the encoding method may change dynamically depending on the additional factors, such as user input, a timing event, or an external trigger. In the example described supra, such a situation occurs when the sensors/motors operate in the different regimes such that, for example, in one region of the sensor/actuator operational state space a spiking signal representation may be more appropriate for data encoding, whereas in another region of operation an analog signal encoding may be more appropriate (e.g. as in the case of the accelerometer, as described above).

In some existing implementations of mixed signal networks, e.g., such as described in U.S. patent application Ser. No. 13/313,826, entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, incorporated supra, neurons may communicate via pulses. As discussed above, such pulses (also referred to as "spikes" or 'impulses') may comprise short-lived (typically on the order of 1-2 ms) discrete temporal events. In some implementations, spikes may correspond to messages, memory content (e.g., binary '0'/'1') and or other event indicators. When using spike communication, information may be encoded into the latency (e.g., a time interval) between two or more spikes and/or with respect to a reference.

In one or more applications, when the duration of the period of activity and/or inactivity must be controlled, it may be advantageous to encode information using pauses in a spiking neuron network. As used herein, the term "pause" may be used to describe an absence of neuron activity (e.g., absence of spikes) for a variable period of time. A pause may be characterized by a duration and/or timing (e.g., the onset time). Information encoding using pauses may be of use when processing multiple sensory and/or action sources and when filtering out redundant and/or unnecessary stimuli.

FIG. 1 illustrates one implementation of a learning apparatus configured to communicate information between spiking neurons using pauses. The apparatus 100 comprises a control block 102, a learning block 110, and a gating block 120. In a variant, the blocks 102, 110, 120 may be implemented using a single mixed signal spiking neuron network. Alternatively, individual blocks 102, 110, 120 may be implemented using two or more mixed signal spiking neuron networks.

The control block 102 may provide a control signal 104 (e.g., a motor control signal to operate an actuator). The gating block 120 may be configured to pass (e.g., gate) the control signal 104 and to generate a gated signal 124 based on a gating input 114 from the learning block 110. In one or more implementations, signal gating may be utilized during selection of one or more of several signals and/or actions. In some control applications where one or more controllers may compete for the same actuators, the gating mechanism may be employed for selecting an action associated with individual controller (and/or from a subset of controllers). In some variants, signal gating may comprise a process in which a predetermined set of conditions, when established, permits another process to occur.

The network of the learning block may be adapted in accordance with a learning rule and a teaching signal 108. In some implementations, inputs into the learning block may comprise the control signal (denoted by the broken line 105 in FIG. 1).

The network of the learning block 110 (and blocks 102, 120) of the apparatus in FIG. 1 may be comprised of spiking neurons. For example, generalized dynamics of a spiking neuron process may be expressed as a superposition of input, interaction between the input current and the neuronal state variables, and neuron reset after the spike as follows:

$$\frac{d\vec{q}}{dt} = V(\vec{q}) + \sum_{t^{out}} R(\vec{q})\delta(t - t^{out}) + G(\vec{q})I^{ext}$$

where:
$\vec{q}$ is a vector of internal state variables (e.g., comprising membrane voltage);

$I^{ext}$ is the external input into neuron;

V is the function that defines evolution of the state variables;

G describes the interaction between the input current and the state variables (for example, to model postsynaptic potentials); and R describes resetting the state variables after the output spikes at $C^{out}$.

For example, for integrate and fire model of the neuron, the state vector and the state model may be expressed as:

$$\vec{q}(t) \equiv u(t); \quad \text{(Eqn. 1)}$$
$$V(\vec{q}) = -Cu;$$
$$R(\vec{q}) = u_{res};$$
$$G(\vec{q}) = 1,$$

where C is a membrane constant, $u_{res}$ is a value to which voltage is set after output spike (reset value). Accordingly, Eqn. 1 becomes:

$$\frac{du}{dt} = -Cu + \sum_{t^{out}} \{u_{refr} - u\}\delta(t - t^{out}) + I^{ext} \quad \text{(Eqn. 2)}$$

In some implementations, the neuron process of Eqn. 1 may be expressed as:

$$\frac{dv}{dt} = 0.04v^2 + 5v + 140 - u + \sum_{t^{out}}(c-v)\delta(t-t^{out}) + I^{ext}$$
$$\frac{du}{dt} = -a(bv - u) + d\sum_{t^{out}}\delta(t - t^{out})$$

where:

$$\vec{q}(t) \equiv \begin{pmatrix} v(t) \\ u(t) \end{pmatrix}; V(\vec{q}) = \begin{pmatrix} 0.04v^2(t) + 5v(t) + 140 - u(t) \\ a(bv(t) - u(t)) \end{pmatrix};$$
$$R(\vec{q}) = \begin{pmatrix} c - v(t) \\ d \end{pmatrix}; G(\vec{q}) = \begin{pmatrix} 1 \\ 0 \end{pmatrix}$$

and a, b, c, d are parameters of the model.

Some algorithms for spike-time learning (especially, reinforcement learning) in spiking neural networks may be represented using the following general equation described, for example, in co-pending and co-owned U.S. patent application Ser. No. 13/487,499 entitled "STOCHASTIC APPARATUS AND METHODS FOR IMPLEMENTING GENERALIZED LEARNING RULES", incorporated supra:

$$\frac{d\theta_i(t)}{dt} = \eta(t)F(t)e_i(t)$$

where:
$\theta_i(t)$ is an adaptation (learning) parameter of a synaptic connection between the pre-synaptic neuron i and the post-synaptic neuron j;
$\eta(t)$ is a parameter referred to as the learning rate;
F(t) is a performance function; and
$e_i(t)$ is eligibility trace, configured to characterize relations between pre-synaptic and post-synaptic activity.

An exemplary eligibility trace may comprise a temporary record of the occurrence of an event, (such as visiting of a state, taking an action, or receipt of pre-synaptic input, etc.). The trace marks the parameters associated with the event (e.g., the synaptic connection, pre- and post-synaptic neuron IDs) as eligible for undergoing learning changes. In one approach, when a teaching (e.g., a reward/punishment signal occurs, only eligible states or actions may be 'assigned credit' for success or 'blamed' for an error. Thus, the eligibility traces aid in bridging the gap between the events and the training information.

The network of the block 110 may be operated in accordance with a learning process. A target signal $\{y^d_j\}$ (e.g., the signal 108 in FIG. 1) may be provided to the network in order to facilitate training. The training method objectives comprise adjustment and modification of neuronal state(s) and/or synaptic parameters in order to achieve a desired output for given input signals. In some implementations, a supervised learning method may be used with the network of the learning block 100, as described with reference to FIGS. 2A-3B, below.

The network of FIG. 1 may comprise one or more connections (e.g., connections providing input 106, and/or connections to the learning block 110 (not shown). Connections may be characterized by one or more synaptic parameters. In some implementations, the parameters may comprise connection strength (weight), probability of data transmission and/or a delay. One or more connections (e.g., connections 106 in FIG. 1) may provide physical inputs comprising continuous (e.g., analog) and/or discrete (e.g., digital) signals describing various physical variables. Examples of such variables may include one or more of temperature, voltage, current, orientation, position, plant state, and other signals. Some connections (e.g., connections 106) may provide spiking (e.g., binary) inputs to a neuron of the network. In some exemplary cases, spiking inputs may correspond to an output of a spiking retina encoder, such as described for example in co-pending U.S. patent application Ser. No. 13/152,119, entitled "SENSORY INPUT PROCESSING APPARATUS AND METHODS", filed Jun. 2, 2011, now issued as U.S. Pat. No. 8,942,466, and U.S. patent application Ser. No. 13/548,071, entitled "SPIKING NEURON NETWORK SENSORY PROCESSING APPARATUS AND METHODS", filed Jul. 12, 2012, now issued as U.S. Pat. No. 8,977,582, each of the foregoing being incorporated herein by reference in its entirety.

During training, state of the network (neurons and/or synapses) may be adapted in accordance with a learning rule. For example, the neuron state adjustment may comprise, a firing threshold adjustment, output signal generation, node susceptibility or excitability modifications according to a variety of methods, such as those described in co-owned U.S. patent application Ser. No. 13/152,105 filed on Jun. 2, 2011, and entitled "APPARATUS AND METHODS FOR TEMPORALLY PROXIMATE OBJECT RECOGNITION", now issued as U.S. Pat. No. 9,122,994, incorporated herein by reference in its entirety.

In some implementations, the neuron process may be characterized by a time constant $\tau_n$=RC, where R is the input resistance and C is the membrane capacitance as defined in Eqn. 3. The firing threshold u may be used to determine output signal generation (firing) of a neuron. In a deterministic neuron, the neuron may generate the output (i.e., fires a spike) whenever the neuronal state variable u(t) exceeds the threshold υ. In a stochastic neuron, firing probability may be described by a probabilistic function of (υ−u(t)), e.g.:

$$p(\upsilon - u(t)) = \exp(u(t) - \upsilon), \text{ where } u(t) < \upsilon$$

When the stochastic neuron generates an output, the state variable u(t) may be reset to a predetermined reset value $u_{reset}(t) < \upsilon$. In an exemplary embodiment, the neuron state variable u(t) may be held at the reset level for a period of time $t_{refr}$, referred to as the refractory period. In absence of any subsequent inputs to the neuron, the neuron state settles at the resting potential $u_{res}(t)$.

In various implementations, the synaptic connection adjustment includes modification of synaptic weights, and/or synaptic delays according to a variety of applicable synaptic rules, such as for example those described in and co-owned and co-pending U.S. patent application Ser. No. 13/239,255 filed on Sep. 21, 2011, and entitled "APPARATUS AND METHODS FOR SYNAPTIC UPDATE IN A PULSE-CODED NETWORK", incorporated herein by reference in its entirety.

Figure 3A:
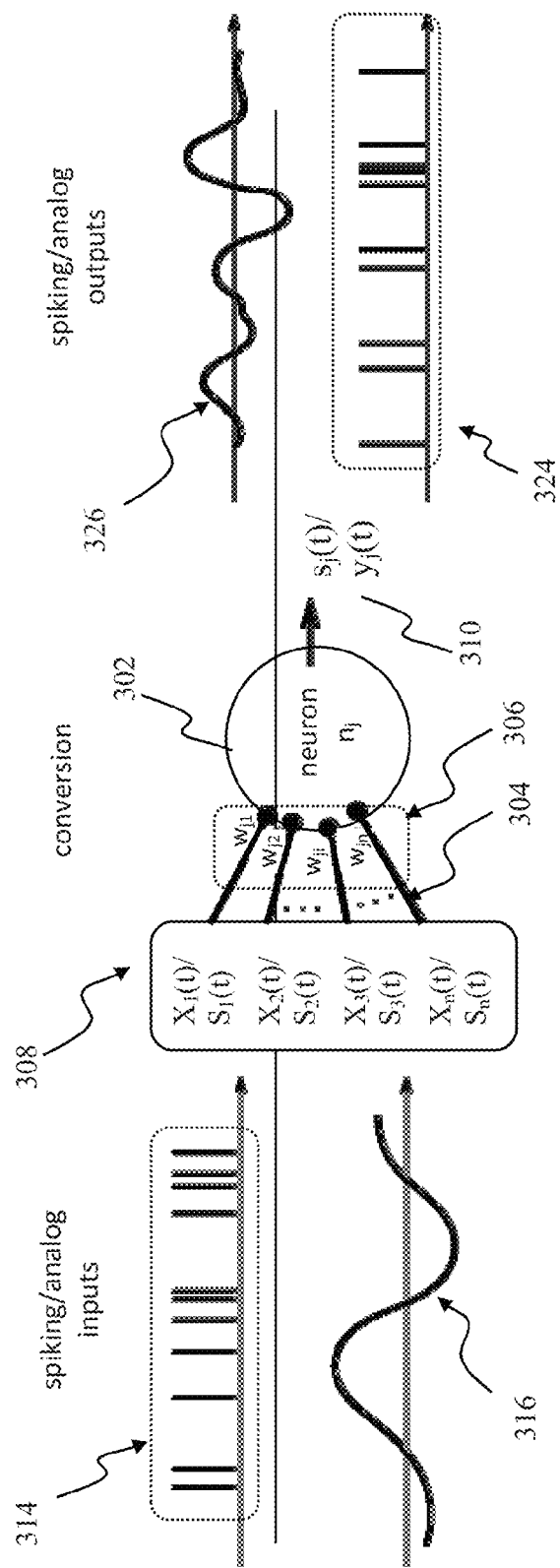
FIG. 3A is a block diagram illustrating analog-to-spiking and spiking-to-analog signal conversion using a universal spiking node according to one or more implementations.

Referring now to FIG. 3A, one exemplary embodiment of a universal mixed signal node operable according to a unified learning rule, that may be configured to operate using both analog and the spiking signals, is described in detail. The mixed signal node 302 receives inputs 308 via synaptic connections 304 and generates outputs 310. The synaptic connections 304 are characterized by synaptic variables w that are modified during learning. The inputs 308 may comprise any combination of analog 314 and/or spiking 316 signals. The output 310 may be either of analog type or the spiking type (shown by the traces 326, 324, respectively, in FIG. 3A).

Figure 3B:
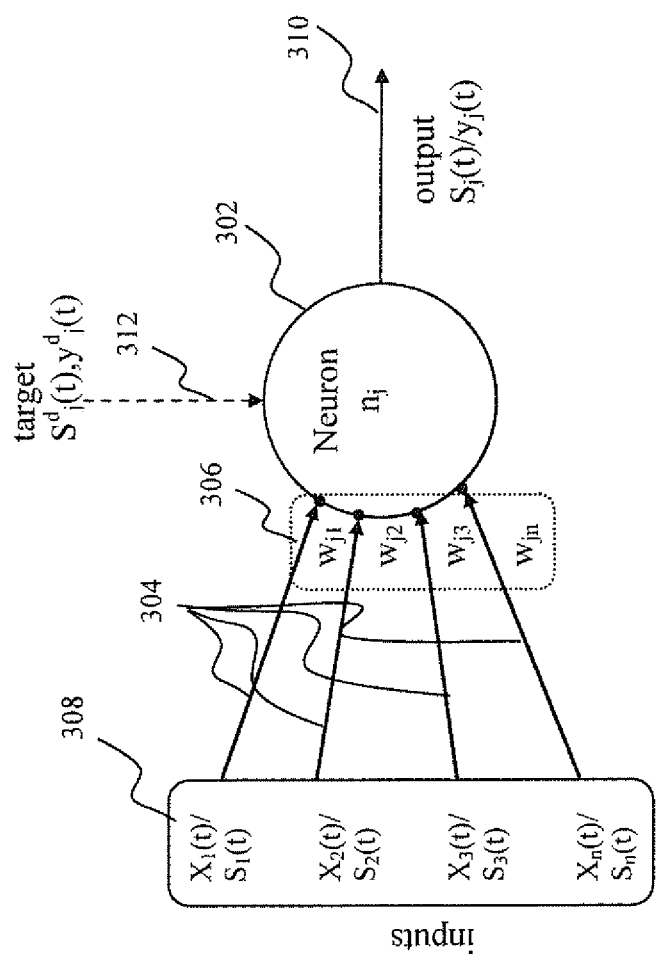
FIG. 3B is a block diagram illustrating supervised learning by a universal node of a mixed signal network configured according to one or more implementations.

In the implementation illustrated in FIG. 3B, the universal node 302 may receive a teaching signal (denoted by the signal $y^d_j(t)$ 312) that may be used to describe the desired output for the $j^{th}$ node.

The universal learning rule of the node 302 may be, for the exemplary embodiment, described as follows:

$$\frac{d\theta_i(t)}{dt} = \eta(t)\left(-\overline{S^d_j}(t) + \overline{S_j}(t)\right)\overline{S_i}(t), \quad \text{(Eqn. 3)}$$

where:
 $\theta_{ji}(t)$ is the efficacy of the synaptic connection from the pre-synaptic neuron i to neuron j;
 $\eta(t)$ is the learning rate;

$$\overline{S^d_j}(t)$$

is low-pass filtered version of the target spike train for neuron j, with a filter time constant $\tau^d_j$;

$$\overline{S_j}(t)$$

is the low-pass filtered version of the output spike train from neuron j, with a filter time constant $\tau_j$; and
 $\overline{S_i}(t)$ is the low-pass filtered version of the i-th input spike train to neuron j, with a filter time constant $\tau_i$.

In some implementations (including the exemplary embodiment above), the low-pass filtered version of the spike train may be expressed as:

$$\overline{S_k}(t) = \int_0^\infty a_k(s) S_k(t-s) ds$$

with a(s) being a smoothing kernel. In one or more variants, the smoothing kernel may comprise an exponential, Gaussian, and/or another function of time, configured using one or more parameters. Further, the parameters may comprise a filter time constant $\tau$. An example of an exponential smoothing kernel is:

$$a_k(s) = \exp(-s/\tau)$$

where $\tau$ is the kernel time constant.

In one or more implementations, the learning rate may be configured to vary with time, as described in detail in U.S. patent application Ser. No. 13/722,769 filed Dec. 20, 2012, and entitled "APPARATUS AND METHODS FOR STATE-DEPENDENT LEARNING IN SPIKING NEURON NETWORKS", now issued as U.S. Pat. No. 8,990,133, the foregoing being incorporated herein by reference in its entirety.

The learning rule given by Eqn. 3 may be applicable to both online learning and batch learning, and the learning rule signal regime (i.e., analog vs. spiking) may be determined by changing just one parameter (or a defined parameter set) as described below. The signals $\overline{S^d_j}(t)$, $\overline{S_j}(t)$ and $\overline{S_i}(t)$ in Eqn. 3 denote the low-pass filtered versions of the target, output, and input spike trains, respectively. In general, however, $\overline{S^d_j}(t)$, $\overline{S_j}(t)$ and $\overline{S_i}(t)$ may be any arbitrary parameterized function F(S) of the respective spike trains, selected such that function output representation uses one of (i) a spiking representation; (ii) an analog signal representation; or (iii) a mixture of both representations. Several exemplary cases of the universal node learning rules are described in detail below.

In one approach, connections may be modeled as a low-pass filter that delivers an input signal (the synaptic response i(t)) into post-synaptic neuron in response to receiving input spikes S(t), described as:

$$i(t) = \int_0^\infty S(t-s) e^{-s/\tau_s} ds$$

The synaptic time constant of the filter corresponds to the parameter $\tau_s$ in Eqn. 11. The synapse may be characterized by a synaptic delay d that defines a delay between the inputs spikes and the synaptic response i(t). In one variant, this may be achieved using the relationship of the input to the synapse, S(t−d).

In some implementations, transmission of spikes by synapses may be described using a deterministic model so that every input (or every input with one or more predetermined characteristics) spike generates a synaptic response i(t). In other implementations, transmission of spikes by synapses may be described using a stochastic approach, where synaptic responses are determined using a stochastic function (e.g., a response probability) based on the input.

Case 1: Learning in the Spike-Timing Domain (Spiking Inputs/Spiking Outputs)

Components of the rule of Eqn. 3 may, in the limit of $\tau_j \to 0$, $\tau^d_j \to 0$ and with $\tau_i$ equal to the corresponding time constant of the i-th input signal, be expressed as $$\overline{S_j}(t) = S_j(t), \overline{S^d_j}(t) = S^d_j(t).$$

Accordingly, the learning rule of Eqn. 3 may be expressed as:

$$\frac{d\theta_i(t)}{dt} = \eta(t)(-S^d_i(t) + S_i(t))\overline{S_i}(t), \quad \text{(Eqn. 4)}$$

The learning rule of Eqn. 4 may be used to effectuate learning for a subset of the input signals reproduce target signals encoded in precise spike timing.

Case 2: Learning in the Firing-rate Domain (Analog Inputs, Analog Outputs)

Components of the rule of Eqn. 3 in the limit where the time constants $\tau_j$, $\tau^d_j$, $\tau_i$ are long enough, such that the signals $$\overline{S_j}(t), \overline{S^d_j}(t) \text{ and } \overline{S_i}(t)$$

may approximate firing rate of the corresponding spike trains, that is $$\overline{S_j}(t) \cong \langle x_j(t) \rangle, \overline{S^d_j}(t) \cong \langle y^d_j(t) \rangle, \overline{S_i}(t) \cong \langle x_i(t) \rangle.$$

In this case, the learning rule of Eqn. 3 may take the form:

$$\frac{d\theta_i(t)}{dt} = \eta(t)(-\langle y^d_j(t)\rangle + \langle x_j(t)\rangle)\langle x_i(t)\rangle, \quad \text{(Eqn. 5)}$$

In Eqn. 7 the signals $$\langle x_j(t)\rangle, \langle y^d_j(t)\rangle, \langle y(t)\rangle$$

may be represented by floating-point values.

Case 3: Spiking Inputs, Analog Outputs

The time constants $\tau_j$, $\tau^d_j$, $\tau_i$ can also be set up such that the spike-based and rate-based (analog) encoding methods are combined by a single universal neuron, e.g., the neuron 302 of FIG. 3A. By way of example, when $\tau_j$, $\tau^d_j$ are long, such that $$\overline{S_j}(t) \cong \langle y_j(t)\rangle, \overline{S^d_j}(t) \cong \langle y^d_j(t)\rangle,$$

and $\tau_i \to 0$, the learning rule of Eqn. 3 may take the following form:

$$\frac{d\theta_i(t)}{dt} = \eta(t)(-\langle y^d(t)\rangle + \langle y_i(t)\rangle)S_i(t), \quad \text{(Eqn. 6)}$$

which may be appropriate for learning in configurations where the input signals to the neuron 302 are encoded using precise spike-timing, and whereas the target signal $y^d_j$ and output signals $y_j$ use the firing-rate-based encoding. In one variant, the analog output signals $y_j$ are represented using the floating-point computer format, although other types of representations appreciated by those of ordinary skill given the present disclosure may be used consistent with the disclosure as well.

Case 4: Analog Inputs, Spiking Outputs

In yet another case, applicable to firing rate based (analog) inputs and spiking outputs, the time constants $\tau_j$, $\tau^d_j$ corresponding to the analog inputs are infinitesimal (i.e. $\tau_j \to 0$, $\tau^d_j \to 0$), such that $$\overline{S_j}(t) = S_j(t), \overline{S^d_j}(t) = S^d_j(t).$$

Further, the time constant $\tau_i$ may be much larger than $\tau_j$, $\tau^d_j$ such that $$\overline{S_i}(t) \cong \langle x_i(t)\rangle.$$

Accordingly, the learning rule of Eqn. 3 may take the following form:

$$\frac{d\theta_i(t)}{dt} = \eta(t)(-S^d_j(t) + S_j(t))\langle x_i(t)\rangle, \quad \text{(Eqn. 7)}$$

This form may be appropriate for training of neurons receiving signals encoded in the neural firing rate and producing signals encoded in precise spike timing.

Other combinations of the spike-based and firing-based encoding within a single trained neuron are also possible. In one such implementation, by setting the time constants $\tau_i$ individually for each synaptic input 304, some inputs 304 become configured to respond to precise spike timing signals, while other inputs become configured to respond only to the firing rate signals.

During learning, model and node network parameter updates may be effectuated, upon receiving and processing a particular input by the node and prior to receipt of a subsequent input. This update mode may be referred to as the online-learning. In some implementations, parameter updates may be computed, buffered, and implemented at once in accordance with an event. In other implementations, the event may correspond to a trigger generated upon receipt of a particular number (a pre-selected or dynamically configured) of inputs, timer expiration, and/or an external event. This mode of network operation is often termed "batch learning".

The learning method described by Eqn. 3 may be generalized to apply to an arbitrary synaptic learning rule as follows:

$$\frac{d\theta_i(t)}{dt} = f(\overline{S_1}(t), \ldots, \overline{S_k}(t)), \quad \text{(Eqn. 8)}$$

where:
$f(\ )$ is a function defined over a set of k input signals;
k is an integer; and
parameterized functions $(\overline{S_1}(t), \ldots, \overline{S_k}(t))$ denote the input signals.

The parameterized functions $(\overline{S_1}(t), \ldots, \overline{S_k}(t))$ may be configured to approximate spiking inputs and/or analog inputs (e.g. corresponding to the instantaneous neural firing rate) depending on the parameter value of functions. In one implementation, the function comprises a low pass filter, and the parameter comprises the time constant $\tau$ of the filter. In one variant, the filter may be given by Eqn. 9. In another variant the filter may comprise an exponential filter kernel defined by Eqn. 10.

The approach described by Eqn. 16 provides a learning continuity for the input signals comprising both the analog and the spiking inputs and for the input signals that change their representation from one type (e.g., analog or spiking) to another in time.

As noted for the specific implementation of the rule described by Eqn. 8, the general approach also permits the training of neural networks that combine different representations of signals processed within networks.

A neural network trained according to one or more implementations may be capable of, inter alia, processing mixed sets of inputs that may change their representation (e.g., from analog to spiking and vice versa) over time, using the same neuron model. In some implementations, a single node may be configured to receive input signals, wherein some sets of inputs to the node carry information encoded in spike timing, while other sets of inputs carry information encoded using analog representation (e.g., firing rate).

In one or more implementations, training of the spiking neural network may enable the same nodes to learn to process different signal types, thereby facilitating node reuse and simplifying network architecture and operation. By using the same nodes for different signal inputs, a requirement for duplicate node populations and duplicate control paths (e.g., one for the analog and one for the spiking signals) is removed and a single population of universal nodes may be adjusted in real time to dynamically changing inputs and outputs. These advantages may be traded for a reduced network complexity, size and cost, or increased network throughput for the same network size.

In reinforcement learning, the input data x(t) may not be available, but are generated via an interaction between a learning agent and the environment. For individual time instance t, the agent may perform an action y_t and the environment generates an observation x_t and an instantaneous cost c_t, according to some (usually unknown) dynamics. The aim of the reinforcement learning is to discover a policy for selecting actions that minimizes some measure of a long-term cost; i.e., the expected cumulative cost. In some implementations, environmental dynamics and/or long-term cost-function associated with individual learning rules (policy) may be unknown in advance. In such implementations, the environmental dynamics and/or the long-term cost may be estimated through experience and learning.

By way of a non-limiting illustration, actions that may be associated with negative reinforcement signal (e.g. received through the environment) may be avoided whenever a similar context is experienced, e.g., a rover that hits an obstacle during learning, may learn to select a different action (e.g., turn right) when a similar context (e.g., visual input) occurs again. Conversely, actions that may result in a positive reinforcement signal may more likely to be executed again in the same context. In one or more implementations, the context may comprise sensory input received by the robot, robot state (e.g., position, speed) and/or other parameters.

In one implementation, training of neural network using reinforcement learning approach is used to control an apparatus (e.g., a robotic device) in order to achieve a predefined goal, such as for example to find a shortest pathway in a maze. This is predicated on the assumption or condition that there is an evaluation function that quantifies control attempts made by the network in terms of the cost function. Reinforcement learning methods like those described in detail in co-owned U.S. patent application Ser. No. 13/238,932 filed Sep. 21, 2011, and entitled "ADAPTIVE CRITIC APPARATUS AND METHODS", now issued as U.S. Pat. No. 9,156,165, incorporated supra, can be used to minimize the cost and hence to solve the control task, although it will be appreciated that other methods may be used consistent with the disclosure as well.

Reinforcement learning is typically used in applications such as control problems, games and other sequential decision making tasks. However, such learning is in no way limited to the foregoing.

In some implementations, the methodology described herein may be utilized with unsupervised learning. In machine learning, unsupervised learning may refer to finding hidden structure in unlabeled data (e.g., clustering, and/or dimensionality reduction). Other tasks where unsupervised learning is used may include without limitation), estimation of statistical distributions, data compression and filtering.

The learning rules described by Eqn. 8, Eqn. 12-Eqn. 15 may be used to implement a neuron network (e.g., the network of the learning block 100 of FIG. 1) where the neurons communicate using pauses.

Figure 2A:
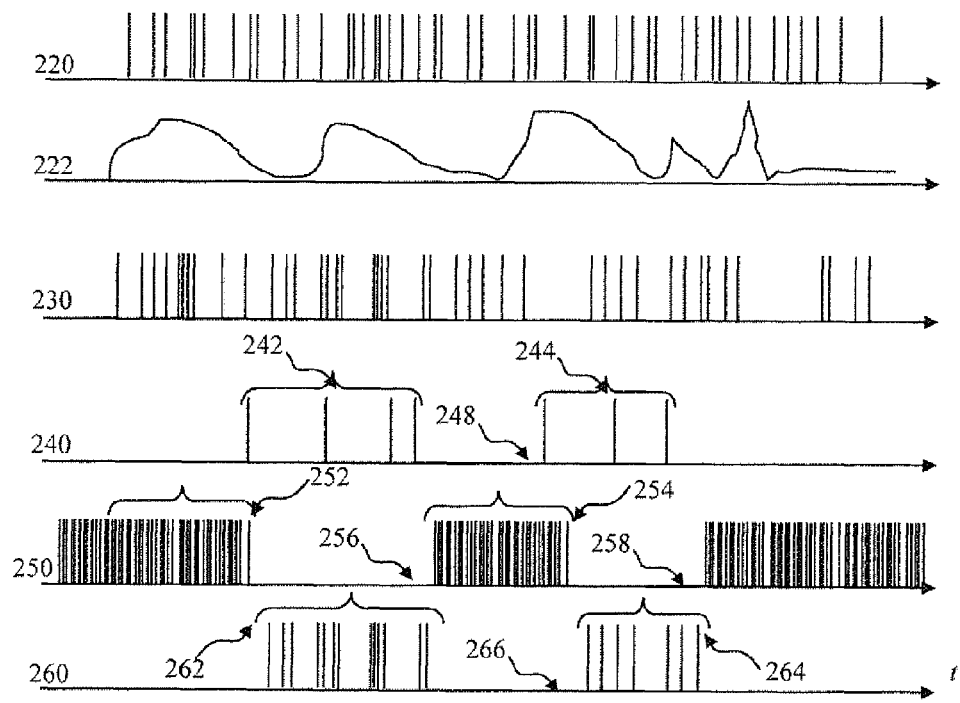
FIG. 2A is a plot illustrating signal activity of the network of FIG. 1 configured to gate a spiking signal, in accordance with one or more implementations.
Figure 2B:
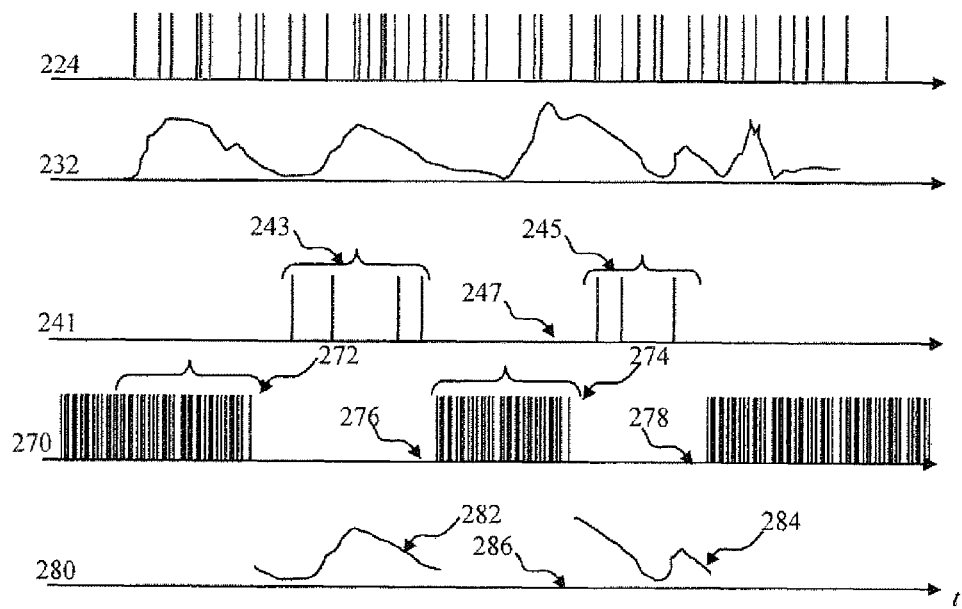
FIG. 2B is a plot illustrating signal activity of the network of FIG. 1 configured to gate an analog signal, in accordance with one or more implementations.

FIGS. 2A-2B illustrate operation of a mixed signal spiking network (e.g., the learning block 110 of FIG. 1) comprising information encoding into pauses. In one or more implementations, the network may comprise one or more spiking neurons (e.g., the neuron 302 of FIG. 3B described above).

Traces 220, 222 in FIG. 2A represent spiking and analog inputs (e.g., the inputs 106 into the learning block 110). Trace 230 represents a spiking control signal 104 comprising a plurality of spikes. Trace 240 depicts teaching signal (e.g., the signal 108 in FIG. 1) comprising two groups of spikes 242, 244 separated by a pause interval 246. The teaching signal 240 may correspond to the training signal $S^d/y^d$ of Eqn. 8, Eqn. 12-Eqn. 15.

Trace 250 depicts activity of one or more of the network neurons. The activity of trace 250 is comprised of several periods of spiking activity (e.g., the spike trains 252, 254) separated by period of inactivity (e.g., the pauses 256, 258).

Trace 260 depicts output activity of the network (e.g., the gated output 124 of FIG. 1). As illustrated in FIG. 2A, the network output 260 is comprised of several periods of activity (e.g., the spike trains 262, 264) separated by periods of inactivity (e.g., the pauses 266, 268).

In some implementations, the active neurons, corresponding to the trace 250, may be configured to provide an inhibitory signal. By way of a non-limiting example, a neuron of the network (that is associated with the trace 250, hereinafter referred to as the neuron 250) may be configured to generate tonic output (e.g. the spike trains 252, 254 that may provide inhibitory input into one or more neurons that are associated with the activity trace 260). In the absence of the teaching signal (default base state), the activity of the trace 250 may inhibit the activity of the trace 260, as indicated by the pauses (e.g., absence of spikes) 266, 268.

Upon receiving one or more teaching spikes 242, 244, the neuron 250 may transition to an inhibited state where the output is suppressed (as indicated by absence of spikes during pauses 256, 258, respectively). Absence of spiking activity on trace 250 may cause spiking activity on trace 260, depicted by spike trains 262, 264.

The spiking activity 262, 264 may correspond to delivery (pass through) of the control signal 230 (e.g., the signal 104 in FIG. 1) and generation of the gated control signal (e.g., the signal 124 in FIG. 1) by the gating portion of the network (e.g., the block 120). When the neuron 250 is active (e.g., corresponding to the time period of the spike trains 252, 254), the gated control output of the trace 260 is suppressed as illustrated by the pause 266.

FIG. 2B illustrates gating of an analog signal by the mixed signal spiking network comprising information encoding into pauses.

Trace 224 in FIG. 2B represents the spiking input (e.g., the input 106 in FIG. 1). Trace 232 depicts an analog control signal (e.g., signal 104 in FIG. 1). Trace 241 presents teaching signal (e.g., the signal 108 in FIG. 1) comprising groups of spikes (e.g., 243, 245 separated by a pause interval 247. The teaching signal 241 may correspond to the training signal $S^d/y^d$ of Eqn. 8, Eqn. 12-Eqn. 15.

Trace 270 illustrates activity of one or more of the neurons of the learning network (e.g. of the block 110 in FIG. 1). The activity of trace 270 is comprised of several periods of spiking activity (e.g., the spike trains 272, 274) separated by periods of inactivity (e.g., the pauses 276, 278).

Trace 280 illustrates output activity of the gating apparatus (e.g., the signal 124 in FIG. 1). The curves 262, 264 may correspond to delivery (pass through) of the analog control signal 232 (e.g., the signal 104 in FIG. 1) to the gating portion of the network (e.g., the block 120). When the neuron 270 is active (e.g., corresponding to the time period of the spike trains 272, 274), the gated control output of the trace 280 is suppressed as illustrated by the pause 286.

In some implementations, the active neurons, corresponding to the trace 270, may be configured to provide an inhibitory signal.

Upon receiving one or more teaching spikes 243, 245, the neuron 270 may transition to an inhibited state where the output is suppressed (as indicated by absence of spikes during pauses 276, 278, respectively). Absence of spiking activity on trace 270 may cause activity on trace 280, depicted by curves 282, 284.

Figure 4:
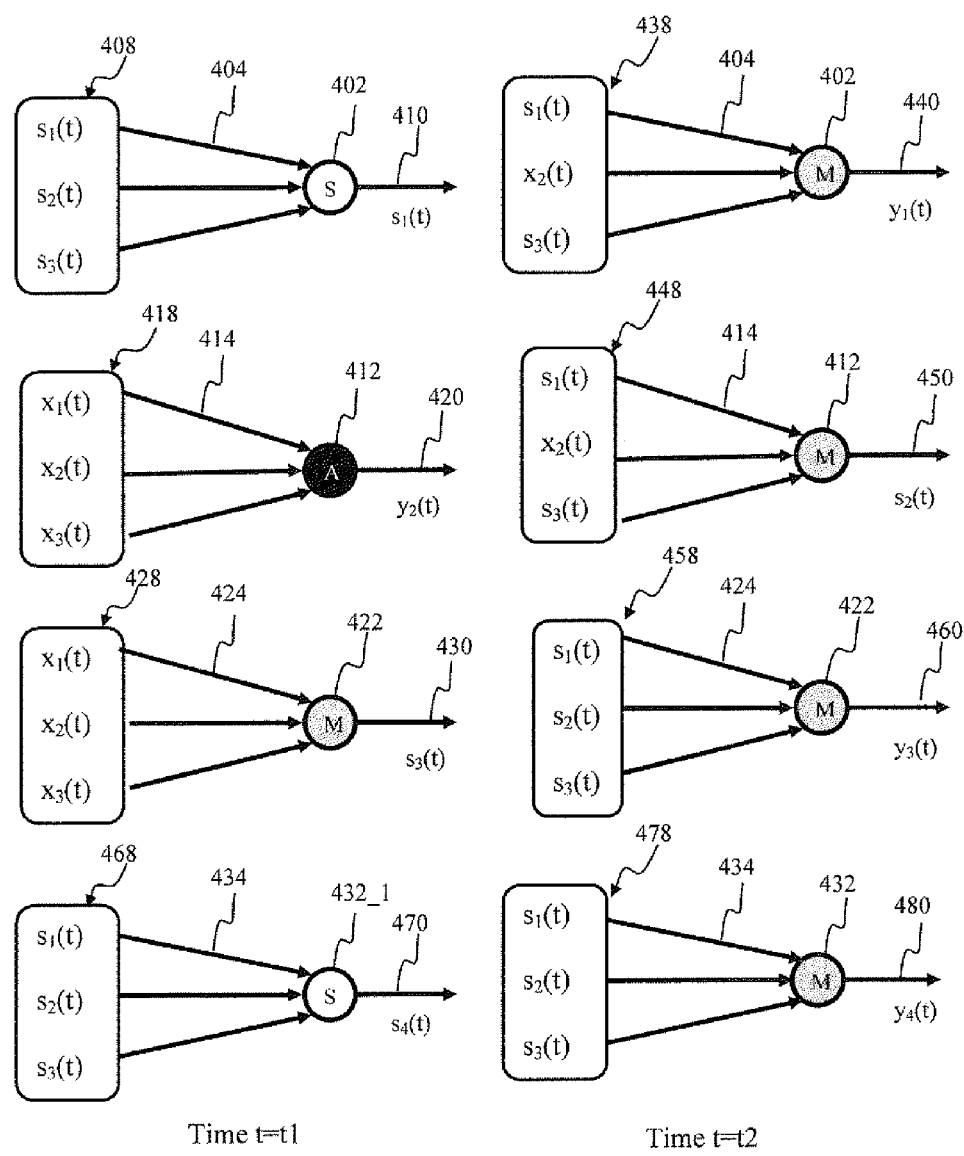
FIG. 4 is a block diagram illustrating a mixed-signal artificial neural network comprising universal nodes configured according to one or more implementations.

Referring now to FIG. 4, an exemplary implementation of a signal conversion approach using the universal nodes (e.g., the node 302 of FIG. 3A) and the universal learning rule described in Eqn. 8 and Eqn. 12 is shown and described in detail. At time t1, the node 402 may receive spiking inputs 408 via the connections 404 and produce spiking output $s_1(t)$ 410; and the node 412 may receive analog inputs 418 via the connections 414 and produce analog output $y_2(t)$ 420. The node 422 receives analog inputs 428 via the connections 424, and produces spiking output $s_3(t)$ 430, and the node 432 may receive spiking inputs 468 via the connections 434, and produce spiking output $s_4(t)$ 470. The nodes depicted by black circles containing the letter 'A' denote nodes operating in a fully analog regime, with all of the inputs and outputs being represented as analog signals. The nodes depicted by white circles containing the letter 'S' denote nodes operating according to fully spiking regime, with all of the inputs and outputs being represented as spiking signals. The nodes depicted by shaded circles and containing the letter 'M" denote nodes operating according to a mixed signal regime, with a mix of analog/spiking inputs and outputs.

At time t2, (i) the node 402 may receive mixed inputs 438 via the connections 404, and it produces analog output $y_1(t)$ 440; (ii) the node 412 receives a group of mixed inputs 448 via the connections 414 and it produces spiking output $s_2(t)$ 450; (iii) the node 422 receives a group of spiking inputs 458 via the connections 424, and it produces analog output $y_3(t)$ 460; and (iv) the node 432 receives a group of spiking inputs 478 via the connections 434 and it produces analog output $y_4(t)$ 480.

It can be seen from FIG. 4 that the same node (e.g., the node 422) may be configured to receive the analog inputs at a first time (e.g., the time t1) to generate the spiking output; and to receive the spiking inputs at a second time (e.g., the time t2) to generate the analog output. A different node (e.g., the node 432 in FIG. 4) may be configured to generate the spiking output 470 at time t1 and the analog output 480 at time t2, when receiving only spiking inputs 468, 478, respectively. Furthermore, nodes (e.g., the node 402, 412) that receive mixed inputs 438, 448, respectively, may generate analog 440 or spiking 450 outputs. The learning method illustrated in FIG. 4 advantageously allow the same nodes to learn processing of different signal types, thereby both facilitating node reuse and simplifying network architecture and operation. By using the same nodes for different signal inputs, the requirement for duplicate node populations and duplicate control paths (e.g., one for the analog and one for the spiking signals) is removed, and a single population of universal nodes may be adjusted in real time to dynamically changing inputs and outputs. These advantages may be traded for a reduced network complexity, size and cost for the same capacity, or increased network throughput for the same network size.

Figure 5:
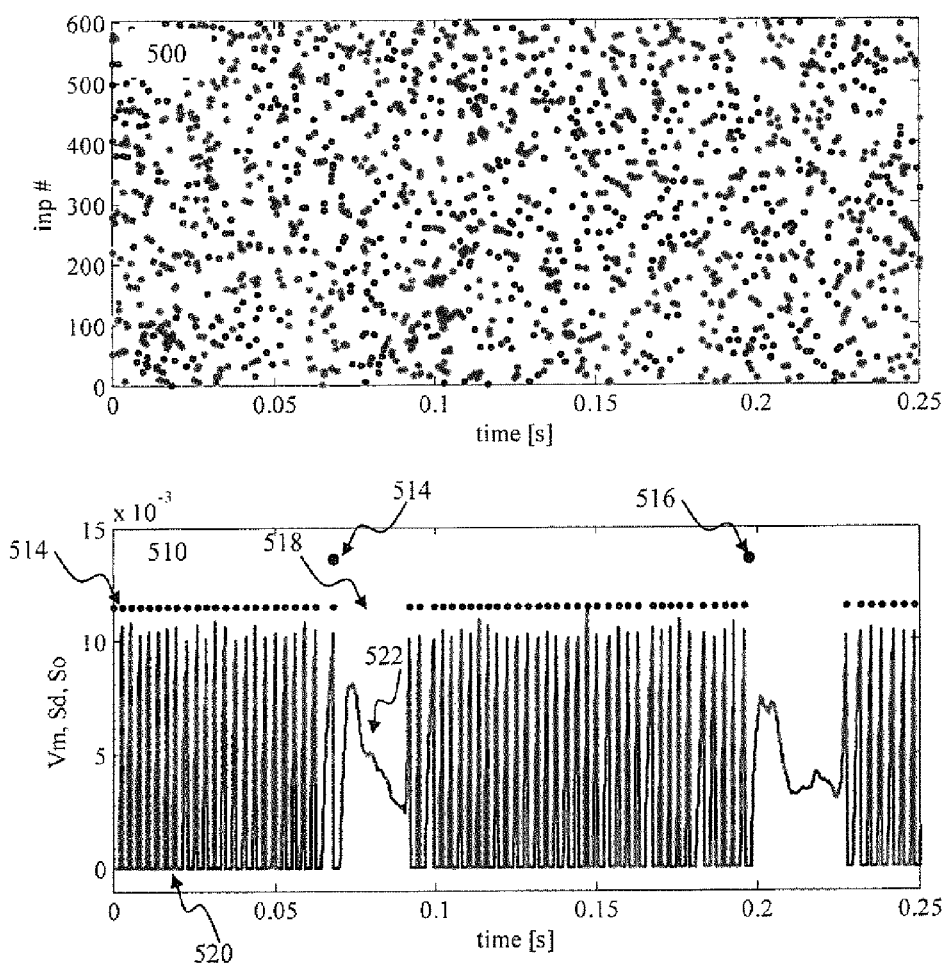
FIG. 5 presents data illustrating spiking-to-spiking signal conversion comprising pauses in accordance with one or more implementations.
Figure 6:
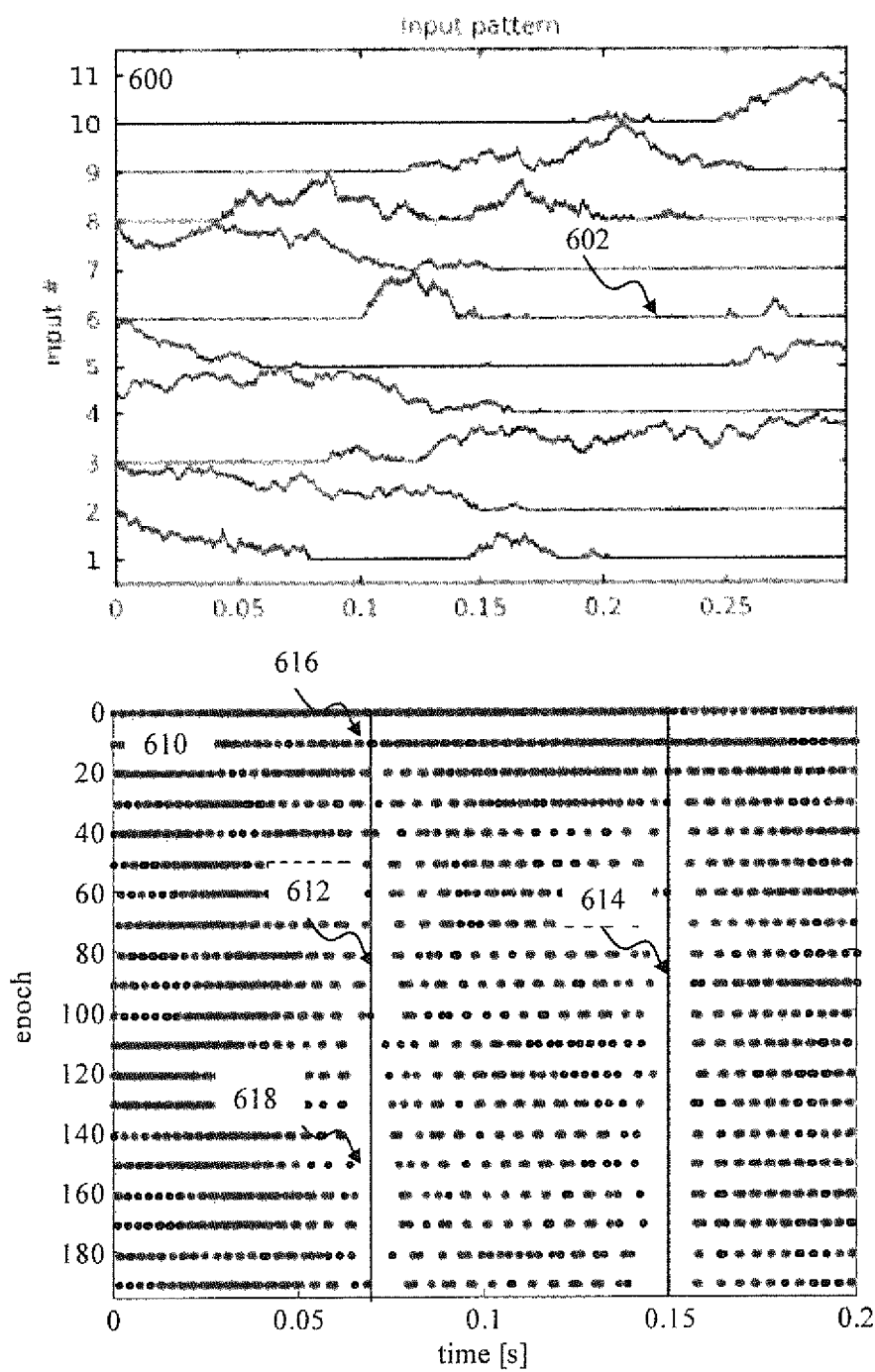
FIG. 6 presents data illustrating analog-to-spiking signal conversion comprising pauses in accordance with one or more implementations.
Figure 7:
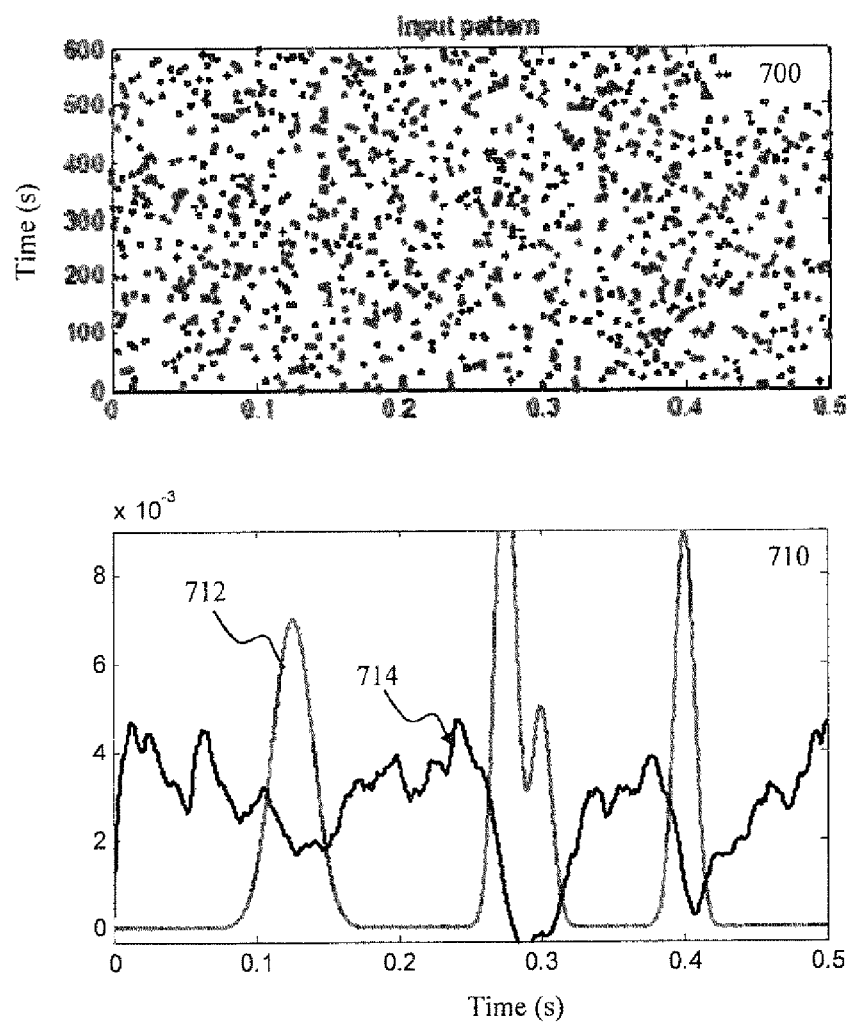
FIG. 7 presents data illustrating spiking-to-analog signal conversion comprising output suppression in accordance with one or more implementations.

FIGS. 5 through 7 present exemplary performance results obtained during simulation and testing, performed by the Assignee hereof, of an exemplary computerized spiking network apparatus configured to implement the state dependent learning framework described above with respect to FIGS. 1-4. The exemplary network used to obtained data presented in FIGS. 5-7 was configured as follows:

1. A single spiking neuron (e.g., the neuron 302 of FIG. 3B) operable in accordance with a deterministic integrate and fire process (e.g., as described by Eqn. 3).

2. 600 input connections (e.g., the connections 304 in FIG. 3B) providing sensory input into the neuron and operated in accordance with an appropriate supervised learning rule (e.g., Eqn. 8-Eqn. 14).

3. A connection (e.g., the connection 312 in FIG. 3B) providing the teaching signal.

FIG. 5 presents data illustrating one implementation of spiking-to-spiking signal conversion the mixed signal network described above. The panel 500 depicts spiking inputs, where individual rows correspond to an input channel and individual dots depict occurrence of spikes. The panel 510 depicts network output spike train 512, teaching signal spikes 514, 516, and a neuron state 520 (e.g., the membrane potential of Eqn. 3). As shown in panel 510, prior to occurrence of the teaching spike 514, the network responds with a tonic output 512 to the input stimulus 500. The neuron state 250 comprises a plurality of potential peaks followed by reset troughs. Upon receiving one (or more) teaching spikes then network output is suppresses, as depicted by the period of inactivity (pause) 518 in panel 510. The neuron state corresponding to the pause is characterized by a slow (compared to the spiking output) changes 522 with time.

After a certain period of time subsequent to the occurrence of the teaching spike 514, the tonic network output is resumed. As shown in FIG. 5, the network, configured in accordance with the learning rule Eqn. 8 (in the configuration given by Eqn. 12), is capable of generating pauses in the spiking output signal consistent with the teaching signal.

FIG. 6 presents data related to simulation results for the network trained using analog input signals and configured to generate spiking signal consistent with the teaching signal using the learning rule Eqn. 8 (in the configuration given by Eqn. 15). The panel 610 in FIG. 6 depicts ten of 600 analog inputs, depicted by individual curves (e.g., the curve 602) selected at random. The panel 600 depicts network spiking output for 200 training epochs, where individual rows correspond to an individual training epoch and individual dots depict occurrence of output spikes. For online learning (depicted in FIG. 6), the node state of a given training epoch is adjusted based on state information obtained in a prior epoch. The information carried from prior epoch(s) may comprise configuration of synaptic weights, node state parameters, and/or other adaptive parameters (e.g., firing threshold, neuronal time constant). The learning rule associated with the data shown in FIG. 6 is configured to cause the network to generate a pause (e.g., suppress spiking output) based on the teaching signal, shown by the lines 612, 614 in FIG. 6.

As shown in the panel 610, at the beginning of training (e.g., the output area 616) network output is little affected in the vicinity of the training input 612. As the training progresses, network gradually learns to pause its output (as shown by the output area 618) in the vicinity of the training input 612.

FIG. 7 presents data related to simulation results for the network trained using spiking input signals and configured to generate analog output signal consistent with the analog teaching signal using the learning rule Eqn. 8 (in the configuration given by Eqn. 14). The panel 700 depicts spiking inputs, where vertical axis corresponds to the input channel number and individual dots depict the occurrence of spikes. The panel 710 depicts network output 714 and training input 712. The learning rule associated with the data shown in FIG. 7 is configured to cause the network to generate a pause (e.g., suppress the output 714) based on the teaching signal 712.

As shown in the panel 710, time periods corresponding to peaks in the training signal (e.g., at about 0.12, 0.3, 0.4 s) level of the output signal 714 is reduced, compared to the output level prior and subsequent to the teaching signal peaks. In some implementations of analog output signal encoding, such reduction in the analog output signal level may correspond to pause generation.

Figure 8:
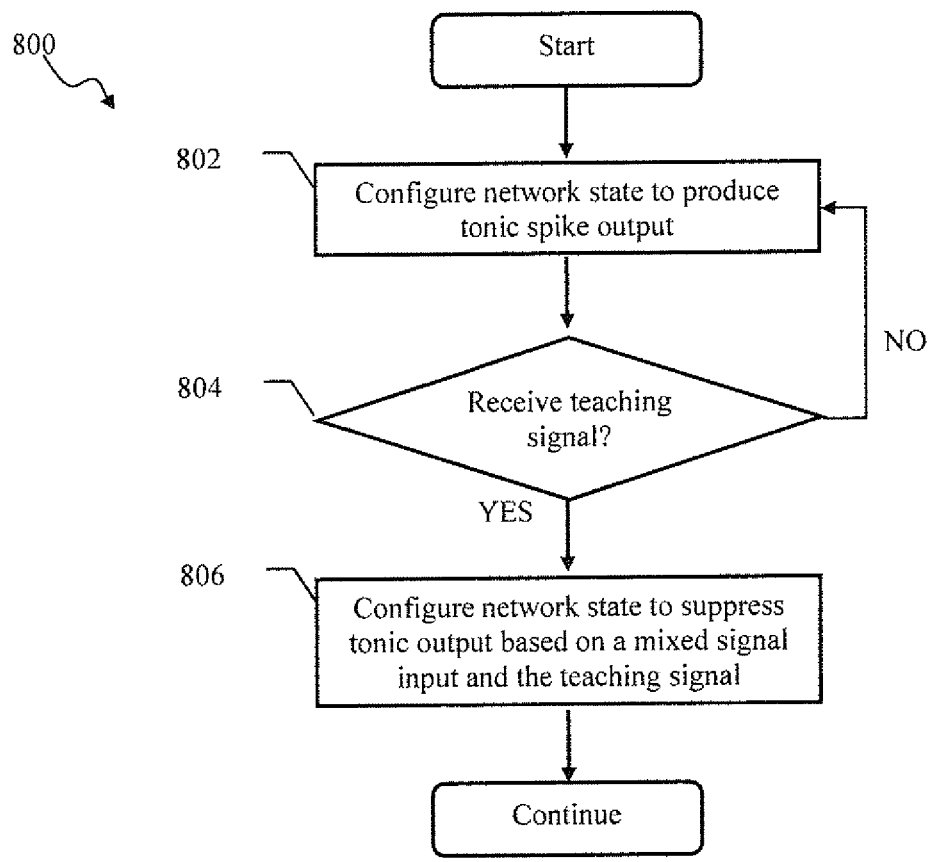
FIG. 8 is a logical flow diagram illustrating a method of synaptic gating by a mixed signal spiking neuron network, in accordance with one or more implementations.
Figure 9:
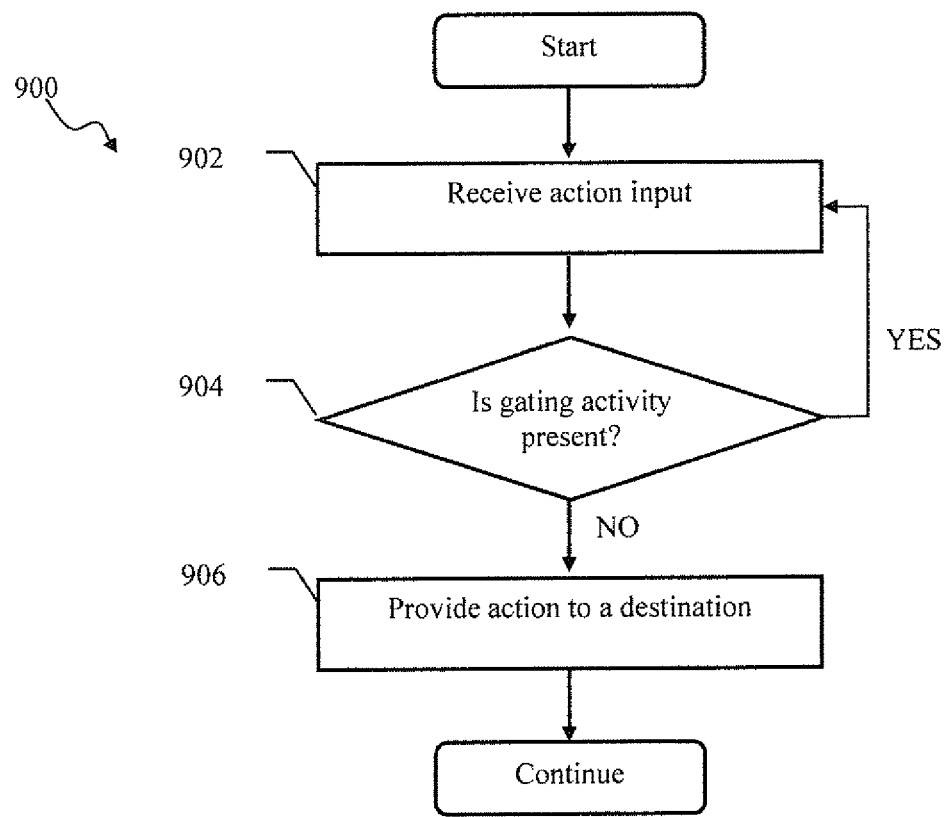
FIG. 9 is a logical flow diagram illustrating a method of learning in a mixed signal spiking neuron network, in accordance with one or more implementations.

FIGS. 8 and 9 illustrate learning methods for use with of state-dependent learning parameter updates for a neuron of a neural network in accordance with one or more implementations. The operations of methods FIGS. 8 and 9 described below are intended to be illustrative. In some implementations, methods 800 and/or 900 may be accomplished with one or more additional operations not described, and/or without one or more of the operations discussed. Additionally, the order in which the operations of methods are illustrated in FIGS. 8 and 9 and described below is not intended to be limiting. For example, the order of two steps of a given method may be inverted without departure for the generalized techniques set forth herein.

In one or more implementations, methods of FIGS. 8 and 9 may be carried out by one or more processing devices (e.g., a digital processor, an analog processor, a digital circuit designed to process information, an analog circuit designed to process information, a state machine, and/or other mechanisms for electronically processing information). The some processing devices may include one or more devices executing some or all of the operations of method 800 and/or 900 in response to instructions stored electronically on an electronic storage medium. The one or more processing devices may include one or more devices configured through hardware, firmware, and/or software to be specifically designed for execution of one or more of the operations of method 800 and/or 900.

Referring now to FIG. 8 a method of synaptic gating by a mixed signal spiking neuron network is shown, in accordance with one or more implementations.

At operation 802 of method 800, state of the network may be configured to produce tonic output. In one or more implementations, the tonic output by the network may comprise one or more signals encoding spiking and/or analog representation. In some variants, the output may be configured based on a sensory input comprising spiking and/or analog signals (e.g., the signals 220, 222 in FIG. 2A).

At operation 804 a determination may be made as to whether a training signal is present. When the training signal is not present, the method may proceed to operation 802.

When the training signal is present, the method may proceed to operation 806 where network state may be adjusted in accordance with a learning process associated with the training signal. In one or more implementations, the network adjustment may be configured to suppress the output in accordance with one or more applicable learning rules (e.g., the rules Eqn. 3-Eqn. 8, described above). In one or more implementations, the duration and the timing (e.g., time of onset) of the pause may be configured based on a teaching signal timing (e.g., teaching spike) and/or parameters of the learning process, such as: (a) the time constants of the low-pass filters adjusted individually for individual signals: $\overline{S_j^d}(t)$, $\overline{S_j}(t)$ and $\overline{S_r}(t)$ and (b) the learning rate parameter $\eta(t)$.

FIG. 9 illustrates a method of learning in a mixed signal spiking neuron network, in accordance with one or more implementations.

At operation 902 of method 900, action input may be received. In one or more implementations, the action input may comprise one or more actions (e.g., a motor commands, sensor activation commands such as for example, depicted by traces 230, 232 in FIGS. 2A-2B).

At operation 904 a determination may be made as to whether a gating activity signal is present. In an exemplary embodiment, the gating activity may correspond to the tonic activity of operation 802 of method 800, and/or signal 250 of FIG. 2A. In various other embodiments, the gating activity may comprise an absence of an inhibitory input into a neuron. When the gating signal is not present, the method may proceed to operation 902.

When the gating signal is present, the method may proceed to operation 906 where (at least a portion of) the action input may be provided to a desired destination. In one or more implementations, the destination may comprise a motor, a motor controller, and/or another network block. Further, it will be appreciated that in some cases, absence of inhibition (associated with the gating activity) e.g., pause 256 in FIG. 2A) may activate gating portion of the network thereby enabling provision of the gate action output.

In one or more variants, the action input may comprise two or more action signals comprising, for example, brake activation and acceleration activation commands for a robotic rover controller. The gating activity may be used to gate individual action signals to cause the rover to brake and/or accelerate at appropriate time instances.

At operation 808 a gated output may be provided. The gated output may be based on a control input provided to the network. The gated output may comprise one or more portions of the control input that correspond to the time periods of the suppressed output (e.g., pauses) effectuated at operation 806. In one or more implementations, the tonic output of step 802 may be used to inhibit activity of a network gating portion. In some variants, absence of tonic output (during a pause) may activate activity of the gating portion thereby enable provision of (for example, the gated control signal at operation 808.

In some implementations, adaptive gating methodology described herein may be utilized in control applications, telecommunication, neurobiology, where it may be of benefit to adaptively learn timing and/or duration of gating events.

Gating mechanisms may be used for selecting appropriate actions (based for example on a learning policy) and/or for resolving conflicts when multiple functional areas of a control system may attempt to access common resources. By way of a non-limiting example of an autonomous rover equipped with a tracking camera, the camera controller may attempt to command the rover platform to move back (in order, for example, to capture full scene), rover navigation controller may attempt to command the rover platform move forward, and/or rover obstacle avoidance controller may instruct the rover platform not to move back (due to an obstacle being present). In such implementations, the gating mechanism may be utilized for selecting action in accordance with a control policy. In one or more implementations, such policies may comprise rover platform preservation (safety); speed of data acquisition (e.g., when performing emergency and/or rescue mission, energy conservation for long autonomous missions, and/or other policy.

In some implementations, a of a mobile robot comprising a navigation controller and a obstacle avoidance controller. When a conflict arises between actions requested by individual controllers (e.g. move left for target approach vs. move right to avoid an obstacle) a gating mechanism, as the one described in the disclosure, may be employed in order to allow individual action to be executed. In one or more implementations, such action selection may be based e.g., on learned priorities and learned duration of the gating.

Again, similar gating mechanisms can be used in telecommunication, when several signals are to be transmitted through a single communication channel with a limited information capacity. Gating is a mechanism that can be used there to allow only selected signals to be propagated through the communication channel. Again it will be advantageous to adaptively learn the priorities and the time window of the access for the particular signals.

In one or more implementations, particular adaptive gating as described in this disclosure, may provide a useful mechanism for operating control systems that may be characterized by a resource 'bottleneck', (e.g., a competition between multiple processes for the same resource(s).

Apparatus and methods implementing universal learning rules of the disclosure advantageously allow for an improved network architecture and performance. Unlike traditional artificial neuronal networks, the universal spiking node/network of the present disclosure is configured to process a mixed set of inputs that may change their representation (from analog to spiking, and vice versa) over time, using the same parameterized model. This configuration advantageously facilitates training of the spiking neural network, allows the same nodes to learn processing of different signal types, thereby facilitating node reuse and simplifying network architecture and operation. By using the same nodes for different signal inputs, a requirement for duplicate node populations and duplicate control paths (e.g., one for the analog and one for the spiking signals) is removed, and a single population of universal nodes may be adjusted in real time to dynamically changing inputs and outputs. These advantages may be traded for a reduced network complexity, size and cost for the same capacity, or increased network throughput for the same network size.

In one implementation, the universal spiking network is implemented as a software library configured to be executed by a computerized spiking network apparatus (e.g., containing a digital processor). In another implementation, the universal node comprises a specialized hardware module (e.g., an embedded processor or controller). In some implementations, the spiking network apparatus may be embodied in a specialized or general purpose integrated circuit, such as, for example ASIC, FPGA, or PLD). Myriad other configurations exist that will be recognized by those of ordinary skill given the present disclosure.

Advantageously, the present disclosure can be used to simplify and improve control tasks for a wide assortment of control applications including without limitation industrial control, navigation of autonomous vehicles, and robotics. Exemplary implementations of the present disclosure are useful in a variety of devices including without limitation prosthetic devices (such as artificial limbs), industrial control, autonomous and robotic apparatus, HVAC, and other electromechanical devices requiring accurate stabilization, set-point control, trajectory tracking functionality or other types of control. Examples of such robotic devices include manufacturing robots (e.g., automotive), military devices, and medical devices (e.g. for surgical robots). Examples of autonomous vehicles include rovers (e.g., for extraterrestrial exploration), unmanned air vehicles, underwater vehicles, smart appliances (e.g. ROOMBA®), etc. The present disclosure can advantageously be used also in all other applications of artificial neural networks, including: machine vision, pattern detection and pattern recognition, signal filtering, data segmentation, data compression, data mining, optimization and scheduling, or complex mapping.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed:

1. A computer-implemented method of synaptic gating in a network, the method being performed by one or more processors configured to execute computer program modules, the method comprising:

generating an output at a node of the network, the output configured to inhibit a gating unit of the network;

based on at least one spiking input signal, at least one continuous input signal and a teaching signal, pausing generation of the output; and based on the pausing, activating the gating unit, thereby effectuating the synaptic gating;

wherein:

generation of the output is characterized by an active node state configured in accordance with a supervised learning process;

the pausing of the output generation is characterized by an inactive node state configured based on the teaching signal; and the teaching signal comprises one or more spikes configured to transition the node into the inactive state.

2. The method of claim 1, wherein the output is encoded using a spiking representation.

3. The method of claim 1, wherein the output is encoded using a continuous representation.

4. The method of claim 1, further comprising adjusting a characteristic associated with at least one connection of a plurality of synaptic connections of the network in accordance with a parameterized rule having at least one parameter associated therewith;
   wherein the characteristic is adjusted based at least in part on modifying the at least one parameter.

5. The method of claim 4, wherein:
   the at least one spiking input signal is received via a first connection of the plurality of connections;
   the at least one continuous input signal is received via a second connection of the plurality of connections; and
   the at least one connection comprises one of the first connection and the second connection.

6. The method of claim 5, further comprising modifying, based at least in part on the reception of the at least one continuous input signal, one other characteristic associated with the second connection according to the parameterized rule;
   wherein: the at least one connection comprises the first connection.

7. The method of claim 4, wherein the parameterized rule comprises a parameterized function of the at least one parameter.

8. The method of claim 4, wherein:
   the parameterized rule comprises a supervised learning rule; and
   the modifying the at least one parameter is configured based at least in part on a training signal, the target signal being representative of a target node output.

9. A neural network configured to implement synaptic gating in accordance with at least one parameterized rule, the network comprising:
   a plurality of connections configured to facilitate transmission of a plurality of spiking and non-spiking signals; and
   a plurality of mixed-mode nodes in operative communication with said plurality of connections, the nodes configured to:
      generate a node output configured to inhibit one or more synaptic gates; and
      based on the at least one parameterized rule, cease generation of the node output for a duration;
      wherein in response to the cessation, the one or more synaptic gates are configured to switch one or more signals transmitted via the plurality of connections.

10. The neural network of claim 9, wherein:
   the at least one parameterized rule comprises a parameterized function of at least one parameter; and
   a characteristic of at least one of the plurality of nodes is configured to be adjusted based at least in part on the at least one parameter.

11. The neural network of claim 10, wherein the at least one parameter comprises an integration time constant.

12. The neural network of claim 10, wherein the at least one parameter comprises one or more of (i) a resting potential (ii) a refractory period, and/or (iii) a firing threshold.

13. The neural network of claim 10, wherein the at least one parameter comprises a level of stochasticity associated with the generation of the node output.

14. The neural network of claim 10, wherein the node output is configured based on a reception of at least one of the plurality of spiking input signals and at least one of the plurality of non-spiking input signals at least one of the plurality of nodes.

15. The neural network of claim 14, wherein the node output comprises at least one of (i) a spiking output and (ii) a non-spiking output.

16. The neural network of claim 14, wherein one or more of the at least one of the plurality of spiking input signals and the at least one of the plurality of non-spiking input signals comprises a reinforcement signal associated with the at least one parameterized rule.

17. The neural network of claim 14, wherein:
   the node output comprises a tonic spiking output; and
   the at least one of the plurality of spiking input signals or at least one of the plurality of non-spiking input signals comprises a teaching signal configured to cause the node to cease output generation for the duration.

18. The neural network of claim 10, wherein:
   the at least one of the plurality of spiking input signals or at least one of the plurality of non-spiking input signals comprises a teaching signal;
   the at least one parameterized rule comprises a supervised learning rule configured based on the at least one parameter and the teaching signal;
   wherein the teaching signal is configured to characterize a target output of the node determined to use the supervised learning rule; and
   wherein the cessation of the output generation by the node is configured to produce the node output consistent with the target output.

19. The neural network of claim 18, wherein:
   the supervised learning rule comprises a logic configured to conduct a sequence of learning trials, where for a given trial of the sequence of trials, the node state is updated based on a value of the learning parameter determined at a preceding trial of the sequence of trials; and
   the cessation of the output generation by the node comprises a modification of the parameter in accordance with the value.

20. The neural network of claim 19, wherein the node output comprises a tonic output encoded by use of an analog representation.

21. The neural network of claim 19, wherein the node output comprises a tonic output encoded by use of spiking representation.

22. The neural network of claim 10, wherein:
   the node output comprises a spiking signal; and
   generation of an output signal at the node is configured based at least in part on a state modification of a state of the node.

23. The neural network of claim 22, wherein:
   the at least one of the plurality of spiking input signals or at least one of the plurality of non-spiking input signals comprises a reinforcement signal;
   the at least one parameterized rule comprises a reinforcement learning rule; and
   the state modification is configured based at least in part on the reinforcement signal, the reinforcement signal configured to be representative of a target network output.

24. The neural network of claim 23, wherein the reinforcement signal is encoded by use of any of (i) spiking signal representation and (ii) analog signal representation.

25. The neural network of claim 22, wherein:
   the at least one parameterized rule comprises an unsupervised learning rule; and
   the state modification is configured based at least in part on one or more of the at least one spiking signal, the at least one analog signal, and the output signal.

26. The neural network of claim 22, wherein the state comprises a level of stochasticity associated with generation of the output signal.

27. The neural network of claim 22, wherein the state comprises at least one of (i) a node excitability, and/or (ii) a node inhibition.

28. The neural network of claim 22, wherein the state comprises a node susceptibility.

* * * * *